(12) United States Patent
Hundal et al.

(10) Patent No.: US 9,727,109 B2
(45) Date of Patent: Aug. 8, 2017

(54) SYSTEMS AND METHODS FOR MANAGING USB POWER DELIVERY

(71) Applicant: Icron Technologies Corporation, Burnaby (CA)

(72) Inventors: Sukhdeep Singh Hundal, Surrey (CA); Thomas Aaron Schultz, Langley (CA); Ardeshir Saghafi, Surrey (CA)

(73) Assignee: Icron Technologies Corporation, Burnaby (CA)

(*) Notice: Subject to any disclaimer, the term of this patent is extended or adjusted under 35 U.S.C. 154(b) by 0 days.

(21) Appl. No.: 15/004,382

(22) Filed: Jan. 22, 2016

(65) Prior Publication Data

US 2016/0216750 A1    Jul. 28, 2016

Related U.S. Application Data

(60) Provisional application No. 62/107,253, filed on Jan. 23, 2015.

(51) Int. Cl.
*G06F 1/26* (2006.01)
*G06F 13/40* (2006.01)
*G06F 13/42* (2006.01)

(52) U.S. Cl.
CPC .......... *G06F 1/266* (2013.01); *G06F 13/4068* (2013.01); *G06F 13/4282* (2013.01)

(58) Field of Classification Search
CPC ............. G06F 13/4282; G06F 13/4068; G06F 1/3253; G06F 1/266
See application file for complete search history.

(56) References Cited

U.S. PATENT DOCUMENTS

| | | | |
|---|---|---|---|
| 6,381,666 B1 | 4/2002 | Kejser et al. | |
| 7,149,833 B2 | 12/2006 | McLeod | |
| 7,149,835 B2 * | 12/2006 | Engler | G06F 13/4045 710/300 |
| 7,334,072 B1 | 2/2008 | Wright | |
| 7,502,878 B1 | 3/2009 | Wright | |
| 7,908,414 B2 | 3/2011 | Combs et al. | |

(Continued)

OTHER PUBLICATIONS

Black Box IC402A USB Extender Manual (Jun. 2010).*
(Continued)

*Primary Examiner* — Jaweed A Abbaszadeh
*Assistant Examiner* — Brian J Corcoran
(74) *Attorney, Agent, or Firm* — Christensen O'Connor Johnson Kindness PLLC

(57) ABSTRACT

Embodiments of the present disclosure provide systems and/or methods for managing power distribution over a USB topology. In some embodiments, a host device is coupled to an upstream facing port device (UFP device) via a USB compliant connection, and a USB device is coupled to a downstream facing port device (DFP device) via a USB compliant connection. The UFP device and DFP device are connected via a non-USB compliant extension medium. In various embodiments, the UFP device and DFP device may be individually powered by different types of sources (such as external power sources, power distributed over the extension medium, batteries, USB bus power, and/or the like). The UFP device and DFP device cooperate to provide USB power distribution functionality throughout the USB topology despite the presence of the non-USB compliant extension medium.

13 Claims, 14 Drawing Sheets

(56) References Cited

U.S. PATENT DOCUMENTS

| | | | |
|---|---|---|---|
| 8,504,707 B2* | 8/2013 | Toebes | H04L 67/2823 |
| | | | 370/465 |
| 8,788,734 B2 | 7/2014 | Sosniak | |
| 8,868,792 B2 | 10/2014 | Schultz et al. | |
| 8,909,951 B2 | 12/2014 | Lin et al. | |
| 9,047,418 B2 | 6/2015 | Hall | |
| 9,129,064 B2 | 9/2015 | Toivanen et al. | |
| 2004/0186926 A1* | 9/2004 | Rapaich | G06F 1/26 |
| | | | 710/8 |
| 2005/0027889 A1* | 2/2005 | Sandulescu | G06F 13/4045 |
| | | | 709/250 |
| 2008/0005395 A1 | 1/2008 | Ong et al. | |
| 2008/0143185 A1* | 6/2008 | Ingles | G06F 1/266 |
| | | | 307/44 |
| 2009/0158377 A1* | 6/2009 | Diab | G06F 1/266 |
| | | | 725/117 |
| 2011/0119506 A1* | 5/2011 | Tsai | H02J 1/04 |
| | | | 713/300 |
| 2013/0086284 A1* | 4/2013 | Shaver | G06F 1/266 |
| | | | 710/18 |
| 2014/0139018 A1* | 5/2014 | Saunders | H02J 4/00 |
| | | | 307/18 |
| 2014/0181325 A1 | 6/2014 | Hundal et al. | |
| 2014/0208134 A1* | 7/2014 | Waters | G06F 1/266 |
| | | | 713/310 |
| 2015/0160705 A1* | 6/2015 | Chen | G06F 1/26 |
| | | | 713/300 |
| 2015/0331464 A1* | 11/2015 | Balasubramanian | G06F 13/387 |
| | | | 713/310 |
| 2015/0331821 A1* | 11/2015 | Liston | G06F 13/387 |
| | | | 710/106 |
| 2016/0231777 A1* | 8/2016 | DeCamp | G06F 1/1632 |

OTHER PUBLICATIONS

"USB 2.0 Extender over Cat5e/6." USB 2.0 Extender over Cat5e/6. N.p., n.d. (2013) Web. Nov. 19, 2016.*

Adder CUSBEXT100-XX USB Extender Brochure, 2014.*

"Universal Serial Bus 3.1 Specification," Revision 1.0, Jul. 26, 2013, Hewlett-Packard Company, Intel Corporation, Microsoft Corporation, Renesas Corporation, ST-Ericsson, and Texas Instruments, 631 pages.

"Universal Serial Bus Power Delivery Specification," Revision 2.0, V1.1, May 7, 2015, Hewlett-Packard Company, Intel Corporation, LSI Corporation, Microsoft Corporation, Renesas, ST-Microelectronics, and Texas Instruments, 544 pages.

"Universal Serial Bus Type-C Cable and Connector Specification," Revision 1.1, Apr. 3, 2015, USB 3.0 Promoter Group, 180 pages.

International Search Report and Written Opinion mailed Mar. 11, 2016, issued in corresponding International Application No. PCT/CA2016/050050, filed Jan. 22, 2016, 6 pages.

\* cited by examiner

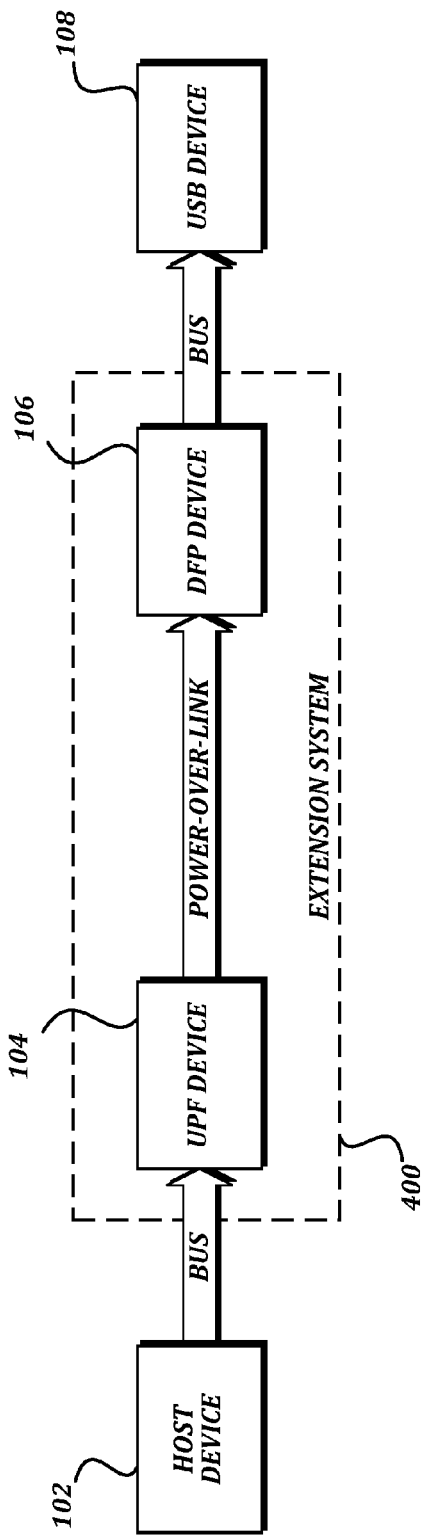
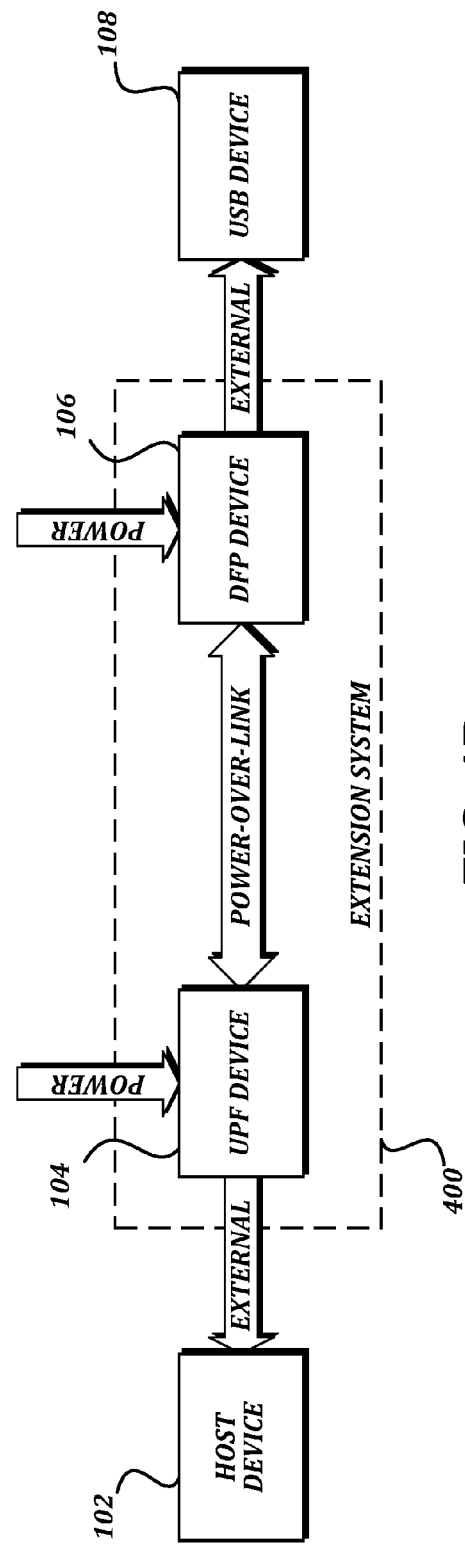

SYSTEMS AND METHODS FOR MANAGING USB POWER DELIVERY

CROSS-REFERENCE TO RELATED APPLICATION

This application claims the benefit of Provisional Application No. 62/107,253, filed Jan. 23, 2015, the entire disclosure of which is hereby incorporated by reference herein for all purposes.

BACKGROUND

Universal Serial Bus (USB) is a peripheral interface for attaching a wide variety of computing devices, such as personal computers, digital telephone lines, monitors, modems, mice, printers, scanners, game controllers, keyboards, storage devices, and/or the like. The specifications defining USB (e.g., Intel et al., Universal Serial Bus Specification, Revision 1.0, January 1996; updated as Revision 1.1 in September 1998; and further updated as Revision 2.0 in April 2000; Universal Serial Bus 3.0 Specification, Revision 1.0, Jun. 6, 2011; Universal Serial Bus 3.1 Specification, Revision 1.0, Jul. 26, 2013; and subsequent updates and modifications—hereinafter collectively referred to as the "USB Specifications", which term can include future modifications and revisions) are non-proprietary and are managed by an open industry organization known as the USB Forum. The USB Specifications establish basic criteria that must be met in order to comply with USB standards. One of ordinary skill in the art will recognize many terms herein from the USB Specifications. Those terms are used herein in a similar manner to their use in the USB Specifications, unless otherwise stated.

Under each of the USB Specifications, certain timing requirements are established that result in a maximum supported length for media that connects USB devices. For example, under the Universal Serial Bus 3.0 Specification, SuperSpeed connections are provided that use a 5 Gbps signaling rate. Though the specification does not mandate any particular maximum cable length, in practical terms the timing mandates and signaling techniques require a regular copper cable used for a SuperSpeed connection between a host and a device to be at most 3 meters long to properly support the SuperSpeed connection. Therefore, non-standard methods and apparatuses are needed to optionally allow for extension of a SuperSpeed USB device to a greater distance from the host to which it is coupled, such that SuperSpeed USB packets may be propagated between the host and the USB device, and such that SuperSpeed connections may be maintained between the host and the USB device even if the host and/or the device enter an idle or suspend state. Some examples of such methods and apparatuses are provided in commonly owned U.S. Pat. No. 8,868,792, issued Oct. 21, 2014, the entire disclosure of which is hereby incorporated herein for all purposes. Similar problems exist for the transmission of USB communication at other speeds (including but not limited to low speed, full speed, and high speed) between a host or hub and a USB device over a non-USB compliant extension medium.

The management of power delivery via USB, including the ability to negotiate voltage, current, and/or direction of power flow over the power conductor ($V_{bus}$), is described in the Universal Serial Bus Power Delivery Specification, Revision 1.0, including Errata through 11 Mar. 2014 (Version 1.3) (hereinafter "USB PD Specification 1.0"), available from the USB Implementers Forum at http://www.usb.org, the entirety of which is incorporated herein by reference for all purposes. The USB PD Specification 1.0 was updated to support the requirements of the USB Type-C specification and to incorporate additional changes, in the USB Power Delivery v2.0 Specification, published Aug. 11, 2014 (hereinafter "USB Power Delivery specification", and collectively with the USB PD Specification 1.0 as "USB PD Specifications") and available from the USB Implementers Forum at http://www.usb.org, the entirety of which is incorporated herein by reference for all purposes.

While the USB PD Specifications do describe the ability to manage power distribution over a USB topology, there is no discussion in the USB PD specifications regarding the management of power distribution in cases where a host or hub and a device are separated by a non-USB compliant extension medium.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system for providing Universal Serial Bus (USB) power delivery across a non-USB extension medium is provided. The system comprises an upstream facing port device (UFP device), a downstream facing port device (DFP device), and a power delivery extension system topology manager (PDESTM). The UFP device includes at least one USB upstream facing port configured to be communicatively coupled to a USB host device, and an extension medium interface configured to be coupled to the non-USB extension medium. The DFP device includes at least one USB downstream facing port configured to be communicatively coupled to a USB device, and an extension medium interface configured to be coupled to the non-USB extension medium. The PDESTM is communicatively coupled to the UFP device and the DFP device and is configured to manage power delivery policies implemented by the UFP device and the DFP device.

In some embodiments, a computer-implemented method performed by a power delivery extension system topology manager of a USB extension system is provided. The USB extension system comprises an upstream facing port device (UFP device) and a downstream facing port device (DFP device). A first power state notification is received from the DFP device. A second power state notification is received from the UFP device. An instruction is sent to the UFP device to report a power state to a system policy manager, the reported power state based on the first power state notification and the second power state notification.

In some embodiments, a USB extension device is provided. The USB extension device comprises at least one USB upstream facing port or at least one USB downstream facing port; an extension medium interface configured to be coupled to an extension medium; a power-over-link engine; and a power delivery extension device policy manager. The power delivery extension device policy manager is configured to determine whether power is available from an external power source; in response to determining that power is not available from the external power source, determine whether power is available from the extension medium; and in response to determining that power is available from the extension medium, draw power for the USB extension device from the extension medium via the power-over-link engine.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 4A-4E are schematic diagrams that illustrate various power distribution topologies that may be supported by embodiments of the present disclosure;

DETAILED DESCRIPTION

Embodiments of the present disclosure provide systems and/or methods for managing power distribution over a USB topology, particularly in situations where the topology includes a local extender (LEX, also known as an upstream facing port device (UFP device)) connected to a USB host or a hub and a remote extender (REX, also known as a downstream facing port device (DFP device)) connected to a USB device, wherein the UFP device and the DFP device communicate via a non-USB compliant extension medium.

Figure 1:
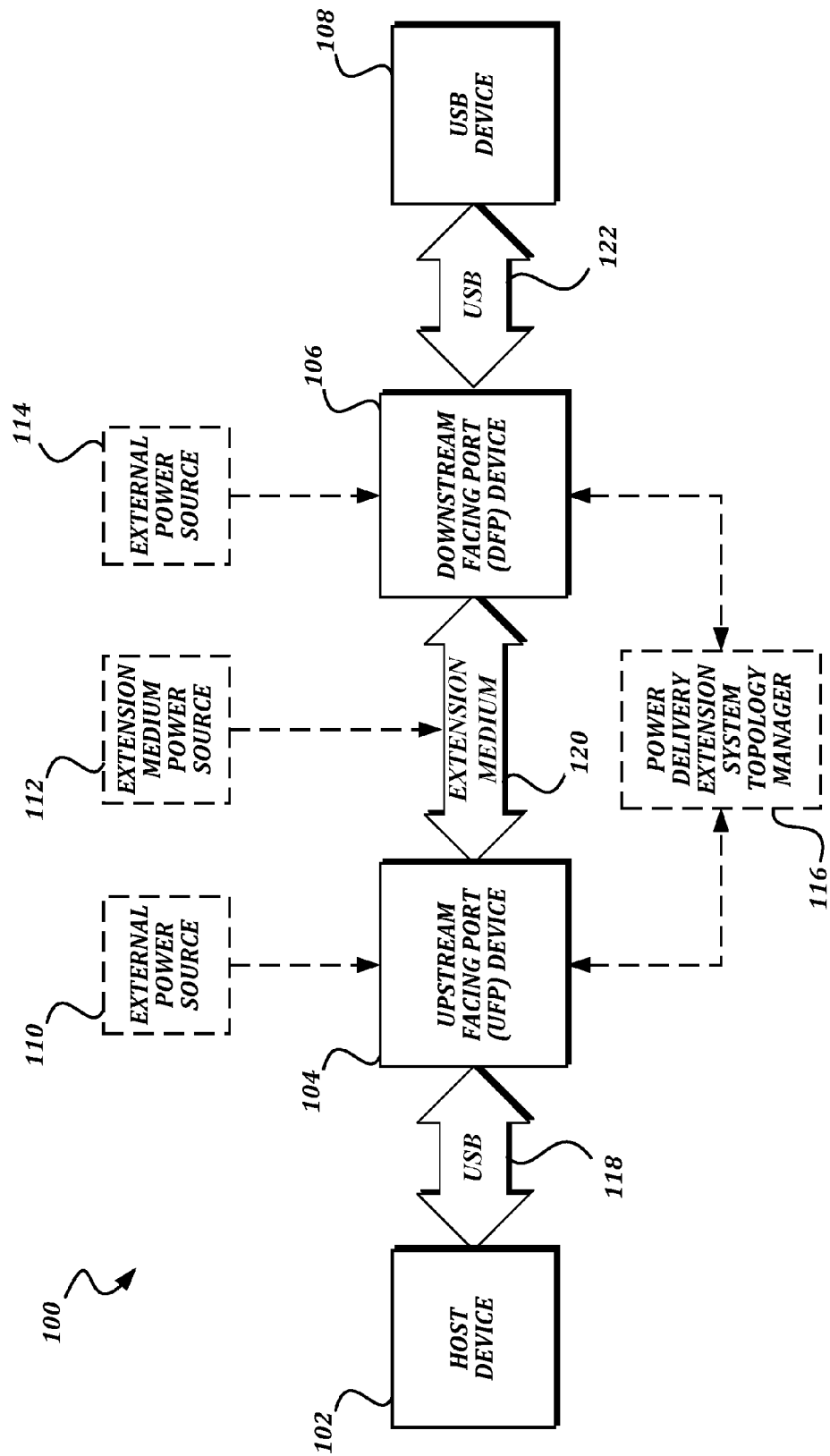
FIG. 1 is a block diagram that illustrates an exemplary embodiment of a system that provides USB power delivery functionality over a non-USB compliant extension medium according to various aspects of the present disclosure.

FIG. 1 is a block diagram that illustrates an exemplary embodiment of a system that provides USB power delivery functionality over a non-USB compliant extension medium according to various aspects of the present disclosure. The system 100 includes a host device 102 and a USB device 108. Traditionally, the host device 102 and the USB device 108 would be directly connected via a USB cable (or connected via USB cables and one or more USB-compliant hub devices), and would communicate directly with one another via a protocol that conforms to a USB specification, such as USB 1.0, USB 1.1, USB 2.0, USB 3.0, or USB 3.1. The host device 102 and the USB device 108 would also exchange information regarding the exchange of power over the USB bus by transmitting USB Power Delivery messages via a USB data channel in order to configure the transmission of power between the host device 102 and the USB device 108. As discussed above, once the host device 102 and USB device 108 are separated by a non-USB communication medium that may or may not support the transmission of power in compliance with the USB Power Delivery specification, issues will arise if the system 100 provides an otherwise transparent USB connection between the host device 102 and USB device 108.

The host device 102 may be any type of computing device containing a USB host controller and supports USB Power Delivery. Some examples of suitable host devices 102 may include, but are not limited to, a desktop computer, a laptop computer, a tablet computing device, a server computer, a set-top box, an audio head unit for an automobile, an embedded host, and/or the like. Likewise, the USB device 108 may be any type of device capable of communicating via a USB protocol with a USB host controller and that supports USB Power Delivery. Some examples of suitable USB devices 108 may include, but are not limited to, a webcam, a human interface device such as a keyboard or mouse, a mass storage device such as a flash drive or external hard drive, a USB-capable medical device, a printer, a USB hub, a wireless controller, a monitor, and/or the like. In some embodiments, devices that otherwise include a USB host controller may take the place of the illustrated USB device 108 in order to act as a USB Power Delivery sink that obtains power from the host device 102. For example, a tablet computing device may be attached to the system 100 as a USB device 108 (instead of a host device 108) in order to charge itself from the host device 102.

In the present system 100, the host device 102 is connected via a USB-compatible connection 118 to an upstream facing port device (UFP device) 104, and the USB device 108 is connected via a USB-compatible connection 122 to a downstream facing port device (DFP device) 106. The UFP device 104 and the DFP device 106 are communicatively coupled via an extension medium 120. The extension medium 120 may increase the distance between the host device 102 and the USB device 108 beyond that supported by the USB Specifications. The extension medium 120 and communication thereon may include any suitable networking technology, such as Ethernet, Bluetooth, WiFi, WiMax, the Internet, serial communication, and/or the like, and any suitable communication medium, such as via physical cables, via wireless spectrum, via fiber-optic cable, and/or the like. In some embodiments, the UFP device 104 and the DFP device 106 may happen to be closer to each other than the short USB requirement distance, and/or may be directly connected by a cable instead of via an extension medium 120.

In some embodiments, the extension medium 120 may be capable of carrying both power and data. For example, the extension medium 120 may include Ethernet cables that are capable of supporting Power over Ethernet (PoE) or similar power transfer techniques. In some embodiments, the extension medium 120 may include separate physical paths for power and data, such as active optical cables that have an optical path for data and a copper conductor for power transmission. In some embodiments, separate connectors may be used as part of the extension medium 120 to segregate power transmission from data transmission (such as using two Ethernet cables, using a simple power cable, and/or the like). In some embodiments, the extension medium 120 does not support transmission of power.

Though only a single USB device 108 is illustrated, it is to be noted that more than one USB device 108 may be coupled to the DFP device 106 via more than one downstream facing port. Also, though the UFP device 104 is illustrated as pairing with a single DFP device 106, in some embodiments, the UFP device 104 may be paired with more than one DFP device 106. In some embodiments, the host device 102 may be separated from the UFP device 104 by one or more USB hubs. Likewise, the DFP device 106 may be connected to an upstream facing port of a USB hub instead of to a USB device 108.

In some embodiments, the UFP device 104 and DFP device 106 enable transparent USB data communication between the host device 102 and the USB device 108 over the extension medium. In other words, host device 102 appears to be directly connected to USB device 108 via USB-compliant connections, despite the presence of the non-USB compliant extension medium 120. Various techniques for enabling such communication are disclosed in various commonly owned U.S. patents, including U.S. Pat. No. 6,381,666, issued Apr. 30, 2002; U.S. Pat. No. 7,149,833, issued Dec. 12, 2006; U.S. Pat. No. 9,129,064, issued Sep. 8, 2015; U.S. Pat. No. 8,868,792, issued Oct. 21, 2014; U.S. Pat. No. 9,047,418, issued Jun. 2, 2015; and U.S. Pat. No. 8,788,734, issued Jul. 22, 2014, the entire disclosures of which are hereby incorporated by reference herein for all purposes.

The system 100 may include one or more external power sources 110, 114. An external power source, as discussed further below, is considered constant and unchanging, such as a wall power source. The system 100 may also include an extension medium power source 112 that, as is discussed further below, can provide power to the UFP device 104 or the DFP device 106 via the extension medium 120 from a separate device. The external power sources 110, 114 and the extension medium power source 112 are illustrated in dashed line to show that, in some embodiments, one or all of these components may not be present.

The system 100 also includes a power delivery extension system topology manager (PDESTM) 116. As discussed in detail below, the PDESTM 116 manages the power delivery functionality of the UFP device 104 and the DFP device 106, and allows USB Power Delivery functionality to be functional despite the presence of the extension medium 120 between the host device 102 and the USB device 108. To that end, the PDESTM 116 is configured to block or cause altered USB Power Delivery messages to be sent to the system policy manager on the host device 102, when appropriate, based on the available power sources and the capabilities of the extension medium 120. In some embodiments, the PDESTM 116 can also manage power requests from a USB device 108 without communicating with the host device 102, in situations where power cannot be transferred over the extension medium 120.

The PDESTM 116 is illustrated as a separate component and is dashed, not because it is optional in the system 100 or is necessarily separate from the UFP device 104 and the DFP device 106, but because it may be in several locations within the system 100. As illustrated below, the PDESTM 116 may be located in UFP device 104, in DFP device 106, or on a separate power delivery system management device 502. The hardware for providing the PDESTM 116 may be present in more than one place in the system 100, but only one PDESTM 116 will be active within the system 100 at any given time.

Figure 2:
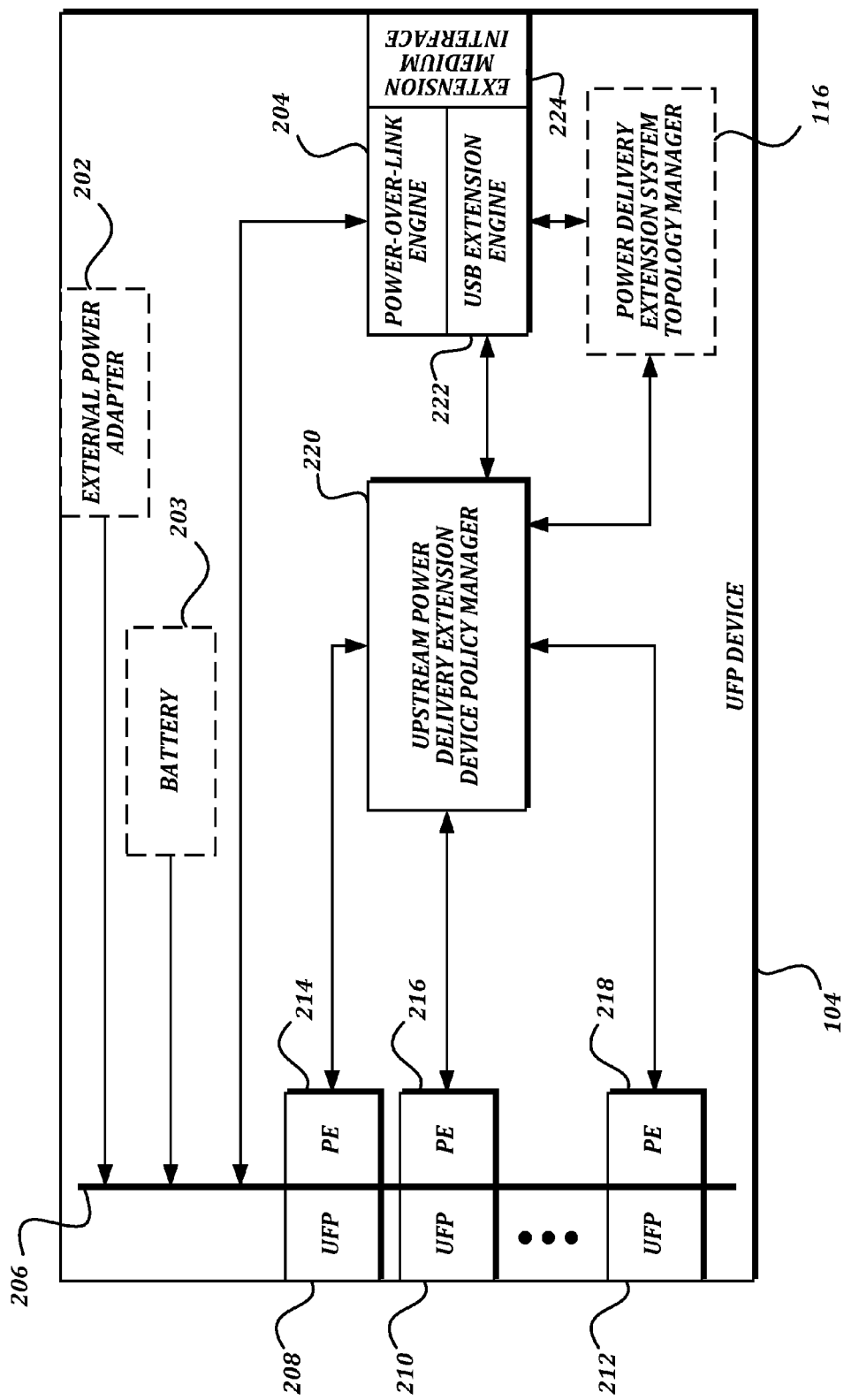
FIG. 2 is a block diagram that illustrates an exemplary embodiment of an upstream facing port device (UFP device) according to various aspects of the present disclosure.

FIG. 2 is a block diagram that illustrates an exemplary embodiment of an upstream facing port device (UFP device) according to various aspects of the present disclosure. The UFP device 104 includes one or more upstream facing ports 208, 210, 212. The upstream facing ports 208, 210, 212 are ports that comply with a USB Specification, such as a Type A port, a Type B port, a micro-variant of one of these ports, a Type C port, and/or any other suitable USB port. In some embodiments, only a single upstream facing port 208 is present. In some embodiments, more than one upstream facing port may be present in order to concurrently provide USB extension and power capabilities to more than one host device 102, or to allow the UFP device 104 to be reconfigured as a DFP device 106.

The UFP device 104 also includes an extension medium interface 224 configured to provide physical access to the extension medium. In some embodiments, the extension medium interface 224 may include an RJ45 jack and its associated circuitry for enabling connection of an Ethernet cable of the extension medium 120 to the UFP device 104. In some embodiments, the extension medium interface 224 may include one or more optical cable connectors and/or active optical cable connectors. In some embodiments, the extension medium interface 224 may include more than one extension medium interface 224 to enable connection to multiple different extension media. In some embodiments, separate physical connections to multiple different extension media may be combined into a single extension medium interface 224.

The USB extension engine 222 of the UFP device 104 works with a USB extension engine 322 of the DFP device 106 to provide USB communication between the host device 102 and the USB device 108 over the non-USB compliant extension medium 120. Further details regarding the USB extension engine 222 and the techniques used to extend USB communication across the non-USB extension medium are provided in the disclosure of the patents incorporated above, and so are not again described here.

The UFP device 104 includes a power bus 206 coupled to each of the upstream facing ports 208, 210, 212. The power bus 206 is also coupled to a power-over-link engine 204, an external power adapter 202, and a battery 203. Each of the external power adapter 202, the battery 203, and the power-over-link engine 204 may be configured to send power to the power bus 206, which may then be drawn by one or more of the upstream facing ports 208, 210, 212. The battery 203 and the power-over-link engine 204 may also be configured to draw power from the power bus 206. For example, an upstream facing port 208 may be configured to draw power from the host device 102, which is then made available on the power bus 206. The battery 203 may then draw this power from the power bus 206 in order to charge itself, and/or the power-over-link engine 204 may draw this power from the power bus 206 in order to transmit power to the DFP device 106 across the extension medium 120.

The external power adapter 202 is configured to be connected to an external power source. Some examples of external power adapters 202 include, but are not limited to, a socket for a detachable power cable; a captive power cable; a socket for a power converter commonly referred to as a wall wart or power brick; a plug for plugging the UFP device 104 directly into a wall socket, and/or the like. The external power source may be any type of power source that can be considered constant and unchanging. A typical example of an external power source is a common wall socket of a commercial or residential building that provides A/C power, though any other similar power source may be used. If the external power adapter 202 is connected to the external power source, the power available to the UFP device 104 via the external power adapter 202 is essentially constant, and is determined by circuitry of the external power adapter 202 and the source to which it is connected. The battery 203 may be any type of disposable or reusable battery commonly used to power electronic devices, such as an alkaline battery, an Li-ion battery, a NiMH battery, and/or the like. In some embodiments, one or both of the external power adapter 202 and the battery 203 are optional, and may be omitted (or may be present but unused).

The power-over-link engine 204 is configured to send power to the extension medium 120 and/or receive power from the extension medium 120. Any technology suitable for transmitting power over an extension medium 120 may be used, including but not limited to Power over Ethernet (PoE), active optical cable (an optical cable paired with a copper wire), a dedicated power cable, and/or the like. As discussed further below, power transmitted to the UFP device 104 from the extension medium 120 may come from the DFP device 106, or may from a separate device such as a PoE switch or injector.

Each upstream facing port 208, 210, 212 is paired with a respective policy engine 214, 216, 218. The policy engines 214, 216, 218 may be implemented according to the USB Power Delivery specification, including Section 8.3 of the specification, and may receive local policies from the upstream power delivery extension device policy manager (upstream PDEDPM) 220. The upstream PDEDPM 220 is configured to handle change requests from policy engines 214, 216, 218, using techniques similar to those in which a device policy manager interacts with policy engines as described in the USB Power Delivery specification. The upstream PDEDPM 220 also interacts with PDESTM 116 in a way similar to how a device policy manager interacts with the system policy manager as defined in the USB Power Delivery specification in that it may pass change requests from the policy engines to the PDESTM 116 for processing and/or approval, and may respond to instructions from the PDESTM 116 that include local policies for the policy engines to implement. The upstream PDEDPM 220 also receives instructions from PDESTM 116 to report changes that occur at the DFP device 106 to the system policy manager of the host device 102, and receives instructions from the PDESTM 116 regarding whether or not to set an "externally powered" bit in communications with the system policy manager on host device 102. These actions are discussed further below.

As illustrated, the UFP device 104 includes a power delivery extension system topology manager (PDESTM) 116. The PDESTM 116 operates in a manner similar to a system policy manager as defined in the USB Power Delivery specification. That is, the PDESTM 116 receives change requests from the upstream PDEDPM 220 and the downstream PDEDPM 320, and provides power delivery policies in response to the change requests based on the power delivery capabilities and power available throughout the extension system. However, instead of gathering topology information for presentation to software on the host device 102, the PDESTM 116 hides the presence of the extension medium 120 from the system policy manager on the host device 102, and compensates for the presence of the extension medium 120 by altering change notifications generated by the UFP device 104 and the DFP device 106 as discussed further below.

The PDESTM 116 is illustrated as optional because it may reside on either the UFP device 104, the DFP device 106, or on a separate power delivery system management device 502. In some embodiments, the circuitry or other hardware for implementing the PDESTM 116 may be present on more than one of the UFP device 104, the DFP device 106, and the power delivery system management device 502. However, during operation, only one PDESTM 116 will be functional for a given power delivery topology. The PDESTM 116 transmits and receives messages similar to the standard USB power delivery messages, which are transmitted via traditional USB data communication techniques. Accordingly, in some embodiments, the PDESTM 116 may communicate with the upstream PDEDPM 220 and the downstream PDEDPM 320 by sending USB information via the USB extension engine 222. In some embodiments, the PDESTM 116 may communicate with remote devices via the extension medium 120 using a proprietary protocol adapted for use on the extension medium 120 (such as TCP/IP, UDP/IP, and/or the like), instead of using the USB extension functionality.

Figure 3:
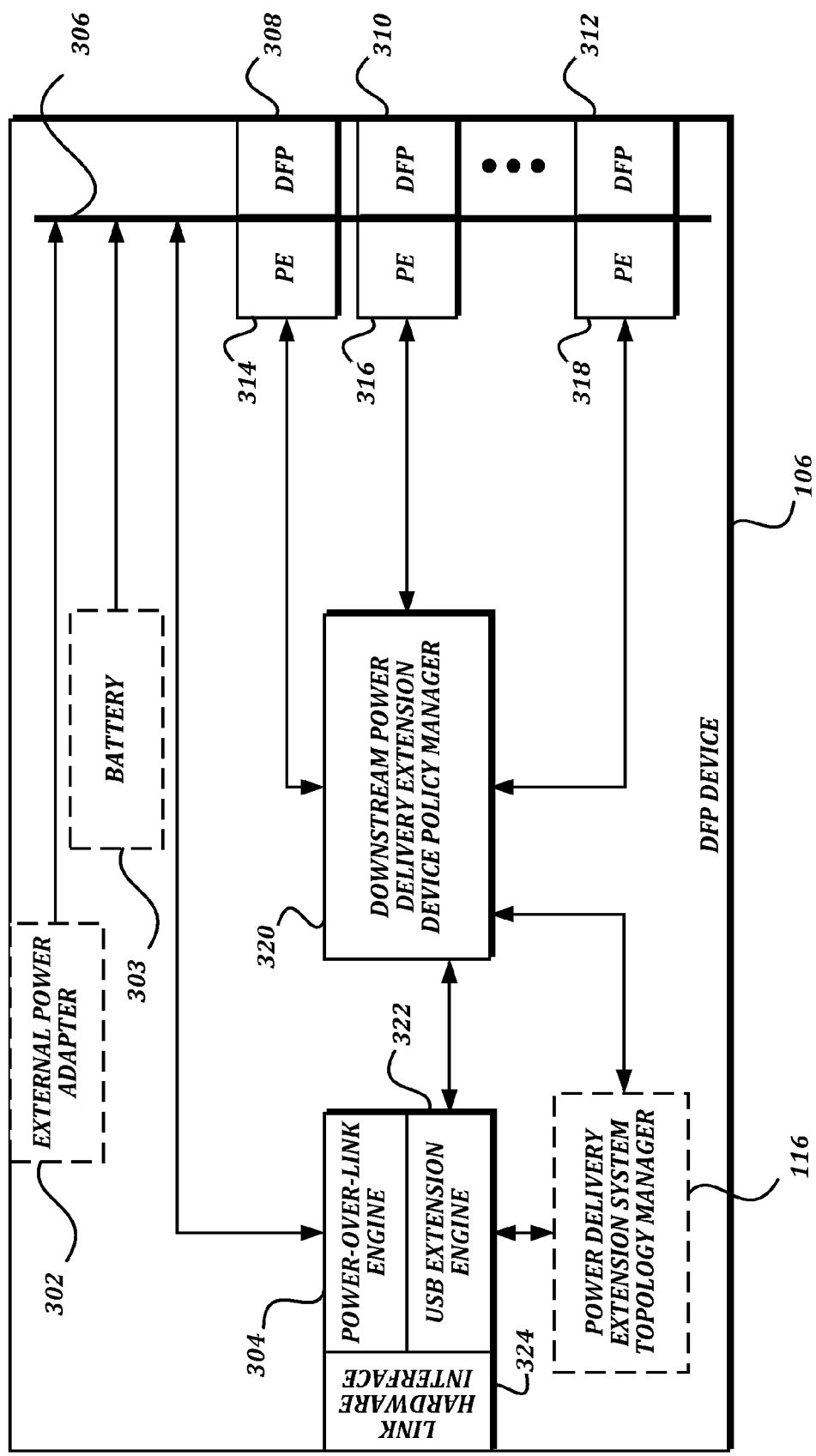
FIG. 3 is a block diagram that illustrates an exemplary embodiment of a downstream facing port device (DFP device) according to various aspects of the present disclosure.

FIG. 3 is a block diagram that illustrates an exemplary embodiment of a downstream facing port device (DFP device) according to various aspects of the present disclosure. The DFP device 106 includes many components that are similar to those within the UFP device 104 illustrated in FIG. 2, such as an external power adapter 302, a battery 303, a power bus 306, a link hardware interface 324, a power-over-link engine 304, and a USB extension engine 322. Since these components were fully described above with respect to the UFP device 104, further description with respect to the DFP device 106 is not necessary.

Instead of having one or more upstream facing ports, the DFP device 106 includes one or more downstream facing ports 308, 310, 312. The downstream facing ports 308, 310, 312 are ports that comply with a USB Specification, such as a Type A port, a Type B port, a micro-variant of one of these ports, a Type C port, and/or any other suitable USB port. In some embodiments, only a single downstream facing port 308 may be present, but in most embodiments, multiple downstream facing ports 308 are present, similar to a USB hub.

As with the UFP device 104, each of the downstream facing ports 308, 310, 312 is paired with a respective policy engine 314, 316, 318 that is implemented according to the USB Power Delivery specification. The downstream power delivery extension device policy manager (downstream PDEDPM) 320 provides local policies to the policy engines 314, 316, 318 as instructed by the PDESTM 116, as discussed further below. Further, as with the upstream PDEDPM 220, the downstream PDEDPM 320 obtains instructions from the PDESTM 116, which may either be operating on the DFP device 106 or communicating to the DFP device 106 from another device via the extension medium 120.

FIGS. 4A-4E are schematic diagrams that illustrate various power distribution topologies that may be supported by embodiments of the present disclosure. The arrows in the illustrations indicate power flow or availability, as discussed in detail in the accompanying text below. The dashed line labeled extension system 400 is provided for ease of discussion, and indicates the portions of the system 100 that are transparent to the host device 102 and the USB device 108, and that are provided by cooperation between the UFP device 104 and the DFP device 106 via the extension medium 120.

In FIG. 4A, neither the UFP device 104, nor the DFP device 106 has access to an external power source, but the extension medium 120 supports power transmission. In this case, the UFP device 104 acts as a USB power delivery sink towards the host device 102, drawing power from the host device 102 over USB to power the extension system 400. The UFP device 104 transfers power to the DFP device 106 via the extension medium 120 in order to power the DFP device 106, and also to power the USB device 108. The power delivered to the USB device 108 is labeled as "bus" in order to indicate that the extension system 400 is not externally powered, since it is obtaining its power from an ultimate source (the host device 102) that is not externally powered, as would be expected according to the USB Power Delivery specification. Though not illustrated, a similar topology may be supported wherein the USB device 108 is externally powered, and the DFP device 106 draws power from the USB device 108 in order to power the UFP device 104 and host device 102 over the extension medium 120.

It is worth noting that because the neither the UFP device 104 nor the DFP device 106 has access to an external power source, the extension system 400 itself is powered by the host device 102. In order to enable this, in some embodiments the UFP device 104 may initially be powered by a default voltage provided by the host device 102 via USB. The UFP device 104 may then request enough additional voltage from the host device 102 via USB Power Delivery in order to also transmit enough power over the extension medium 120 to power the DFP device 104 as well (taking into account losses over the extension medium 120). In embodiments wherein the extension system 400 is transparent to the host device 102, the UFP device 104 may maintain a connected but disabled state in communications with the host device 102 so that the host device 102 provides default (or requested) power but does not try to enumerate endpoints. In some embodiments, upon connection of a USB device 108 that requests additional power, the UFP device 104 may disconnect from and reconnect to the host device 102 in order to obtain the additional power, or may submit a USB Power Delivery change request as discussed below.

In FIG. 4B, both the UFP device 104 and the DFP device 106 have access to external power sources, and the extension medium 120 also supports power transmission. In this case, the UFP device 104 can provide power to the host device 102 over USB, and the DFP device 106 can provide power to the USB device 108 over USB. If needed, the UFP device 104 and DFP device 106 can also exchange power over the extension medium 120 in order to meet a power request that is greater than either of the external power sources can meet alone. Because the ultimate source of the power provided to both the host device 102 and the USB device 108 is an external power source, both the UFP device 104 and the DFP device 106 can report their power source as externally powered according to the USB Power Delivery specification. Though not illustrated, a similar topology is also supported wherein power cannot be transmitted via the extension medium 120. The only difference would be that the UFP device 104 and the DFP device 106 would not exchange power over the extension medium 120, but since they are both externally powered, they could both still provide power to connected devices via USB.

Figure 4C:
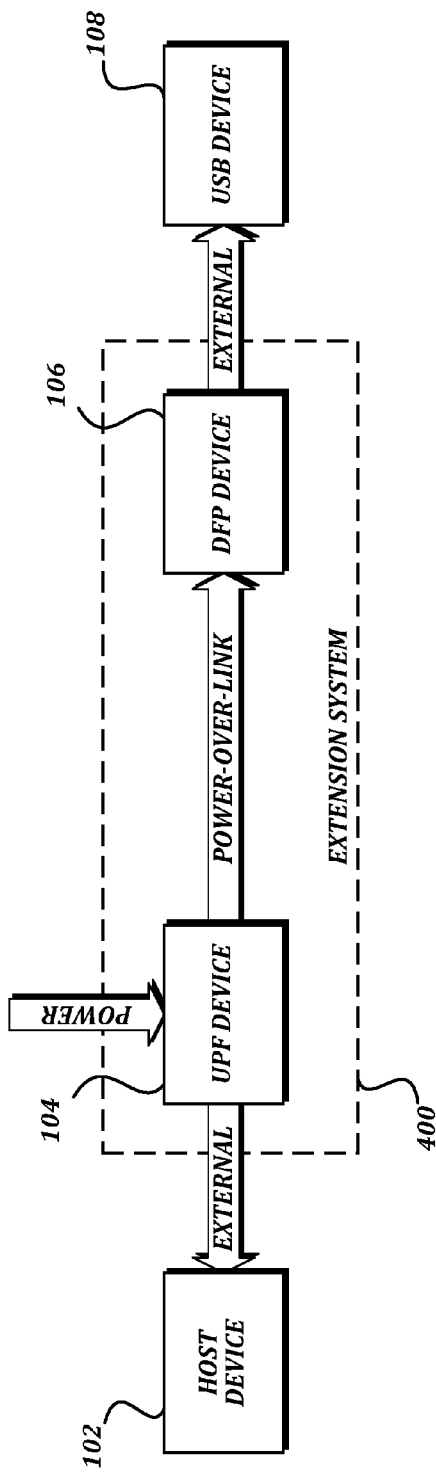

In FIG. 4C, only the UFP device 104 has access to an external power source, and the extension medium 120 supports power transmission. In this case, the UFP device 104 can provide power to the DFP device 106 via the extension medium 120, and the DFP device 106 can, in turn, provide this power to the USB device 108 over USB. The UFP device 104 can also provide power to the host device 102. Because the ultimate source of the power provided throughout the system is an external power source, both the UFP device 104 and the DFP device 106 can report their power source as externally powered according to the USB Power Delivery specification, even though the DFP device 106 is receiving power from the extension medium 120 instead of an external power source.

Figure 4D:
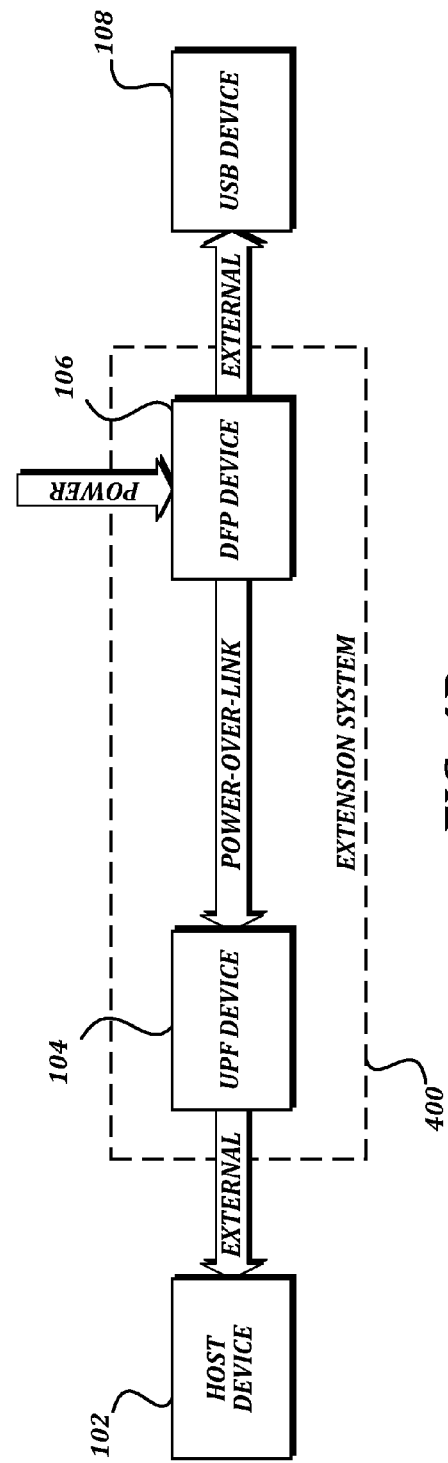

In FIG. 4D, only the DFP device 106 has access to an external power source, and the extension medium 120 supports power transmission. This embodiment is similar to that illustrated in FIG. 4C, though it is the DFP device 106 and not the UFP device 104 that is externally powered. The DFP device 106 can provide power to the UFP device 104 over the extension medium 120 in order to power the UFP device 104, and so that the UFP device 104 may provide power over USB to the host device 102. The DFP device 106 can also provide power to the USB device 108 over USB. Both the UFP device 104 and the DFP device 106 may report their power source as externally powered according to the USB Power Delivery specification because the ultimate source of the power is the external power source used by the DFP device 106.

Figure 4E:
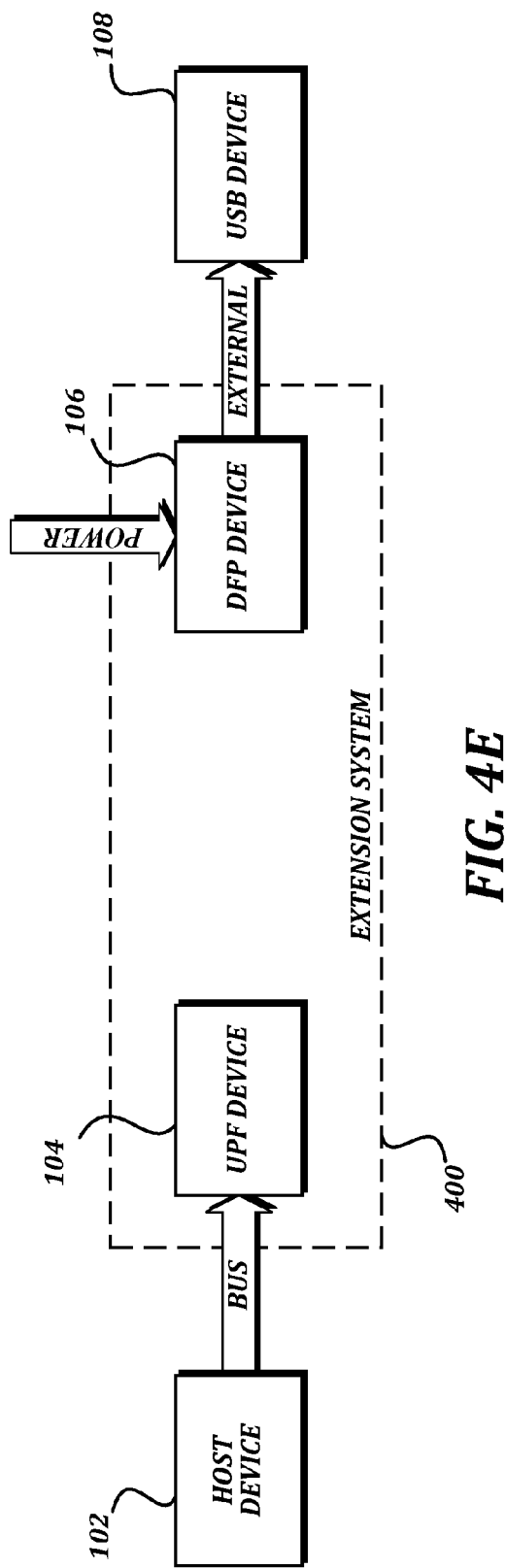

In FIG. 4E, only the DFP device 106 has access to an external power source, and the extension medium 120 does not support power transmission (though it does still support the transmission of data). In such an embodiment, a fully transparent extension system 400 can run into problems because the power source information is no longer consistent between the UFP device 104 and the DFP device 106. The DFP device 106 draws power from its external power source. The UFP device 104, because it does not have an external power source, draws power from the host device 102 over USB. Because the DFP device 106 is receiving power from an external power source, it can provide power to the USB device 108 and it can report its power source as externally powered. However, the UFP device 104 reports its power source as not externally powered to the host device 102 so that the host device 102 will not attempt to swap roles or otherwise stop providing power to the UFP device 104. As discussed further below, the PDESTM 116 manages power requests on the DFP device 106, so that the USB device 108 may still access full USB Power Delivery functionality despite the presence of the extension medium. The PDESTM 116 may also hide the USB device 108 from the system policy manager on the host device 102 so that the host device 102 does not end up having inconsistent information. In some embodiments, the PDESTM 116 may present the USB device 108 to the system policy manager as being self-powered (even though it is receiving power from the DFP device 106) so that the system policy manager would not try to reconfigure the USB device 108.

Figure 5:
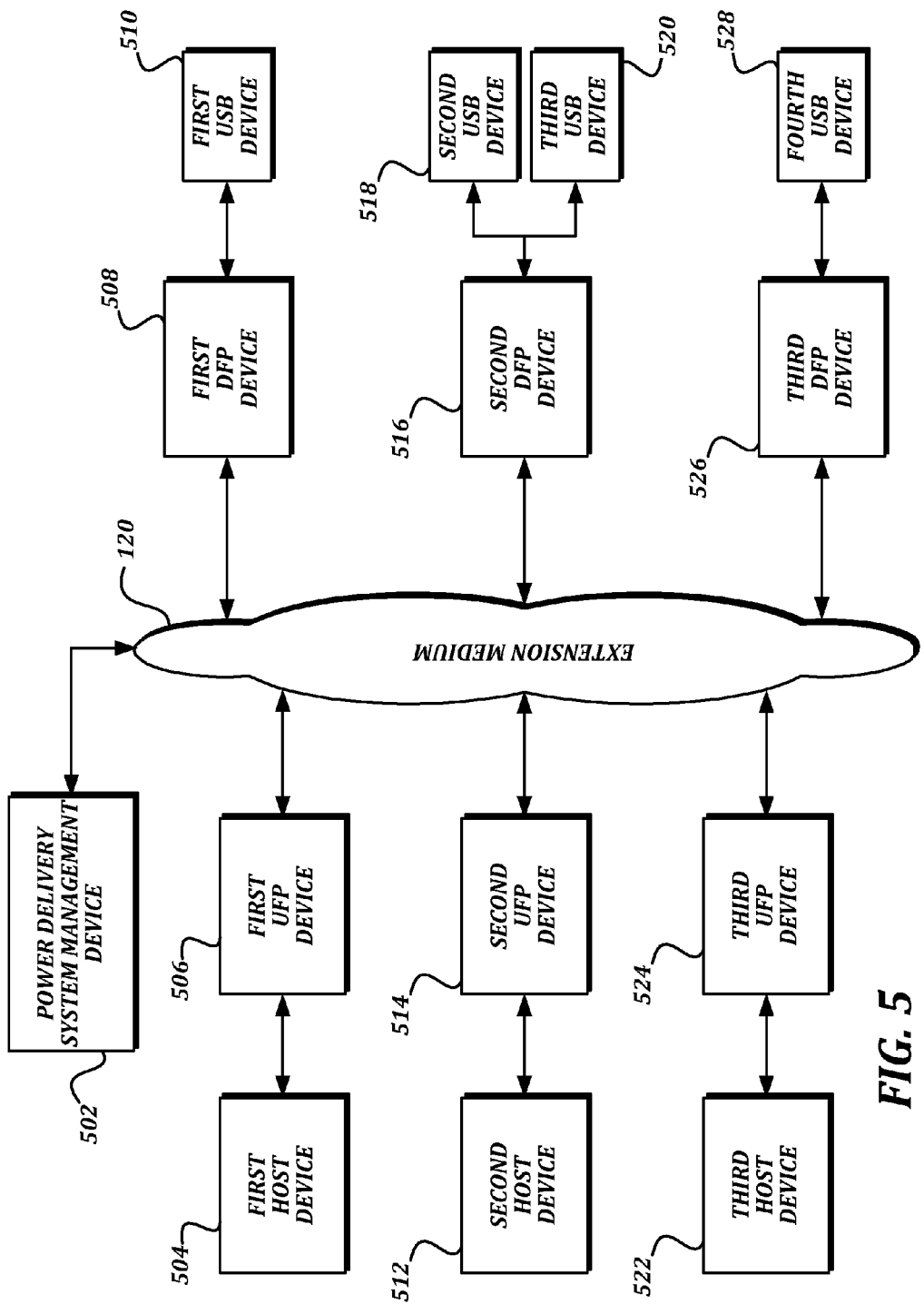
FIG. 5 is a schematic diagram that illustrates an exemplary power delivery topology according to various aspects of the present disclosure.

FIG. 5 is a schematic diagram that illustrates an exemplary power delivery topology according to various aspects of the present disclosure. In FIG. 5, power is provided over the extension medium 120 by a power delivery system management device 502 that is separate from any UFP device or DFP device. One example of a power delivery system management device 502 that can provide power via the extension medium 120 is endspan power sourcing equipment such as a Power-over-Ethernet switch. Another way in which power may be provided on the extension medium 120 by a separate device is by the use of one or more midspan devices such as PoE injector devices. The use of a power delivery system management device 502 also allows the PDESTM 116 to reside on the power delivery system management device 502 instead of a UFP device or a DFP device. This can allow the PDESTM 116 to balance power requests across the entire extension medium 120, even if multiple UFP devices and/or DFP devices are present on the extension medium 120. In some embodiments, the PDESTM 116 may reside on a UFP device or a DFP device, but communicates with the power delivery system management device 502 to balance power requests across the entire extension medium 120.

As illustrated in FIG. 5, multiple UFP devices 506, 514, 524 may be coupled to the extension medium 120, as may multiple DFP devices 508, 516, 526. Pairings between UFP devices and DFP devices may be managed by any suitable technique, including one or more techniques described in commonly owned, co-pending U.S. application Ser. No. 13/791,579, filed Mar. 8, 2013, the entire disclosure of which is hereby incorporated by reference for all purposes. In an exemplary configuration, the first UFP device 506 is paired with the first DFP device 508 to allow USB communication between the first host device 504 and the first USB device 510; the second UFP device 514 is paired with the second DFP device 516 to allow communication between the second host device 512, the second USB device 518, and the third USB device 520; and the third UFP device 524 is paired with the third DFP device 526 to allow communication between the third host device 522 and the fourth USB device 528.

Because power delivered on the extension medium 120 is provided by the power delivery system management device 502, power requests across the entire extension medium 120 are managed by the PDESTM 116 in conjunction with the power delivery system management device 502. For example, the power delivery system management device 502 may support a maximum of 50 W of power across the entire extension medium 120. If the first USB device 510 submits a change request for more power to the first DFP device 508, the first DFP device 508 submits the change request for more power to the PDESTM 116. The PDESTM 116 reviews all power being provided throughout the extension medium 120, including power provided to the first UFP device 506 and first DFP device 510, as well as to the second UFP device 514, the second DFP device 516, the third UFP device 524, and the third DFP device 526, in order to determine whether the additional power can be provided to the first DFP device 508 without reaching the 50 W power maximum of which the power delivery system management device 502 is capable of providing.

If the PDESTM 116 determines that the additional power can be provided without reaching the power maximum, then the change request may be approved. If the PDESTM 116 determines that providing the additional power would cause the power delivery system management device 502 to go over its power limit, the PDESTM 116 may submit requests to any of the extension devices on the network (even extension devices that are not paired with the first DFP device 508 or the first UFP device 506) to give power back as described in the USB Power Delivery specification in order to service the additional power request from the first USB device 510. One of ordinary skill in the art will recognize that the topology illustrated in FIG. 5 is exemplary only, and that in other embodiments, more or fewer devices may be present.

Figure 6A:
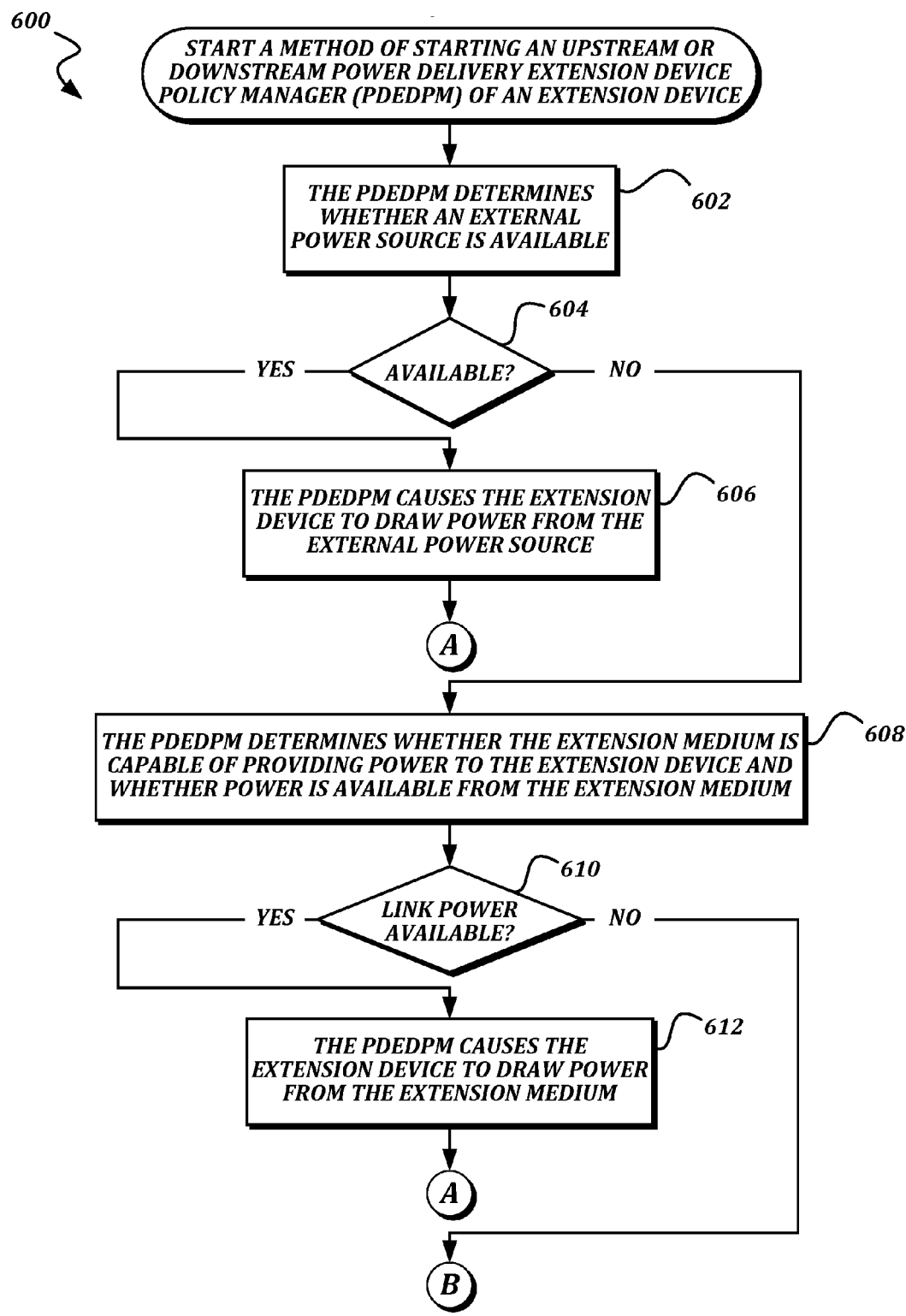
FIGS. 6A-6B are a flowchart that illustrates an exemplary embodiment of a method of starting an upstream or downstream power delivery extension device policy manager (PDEDPM) of an extension device, according to various aspects of the present disclosure.
Figure 6B:
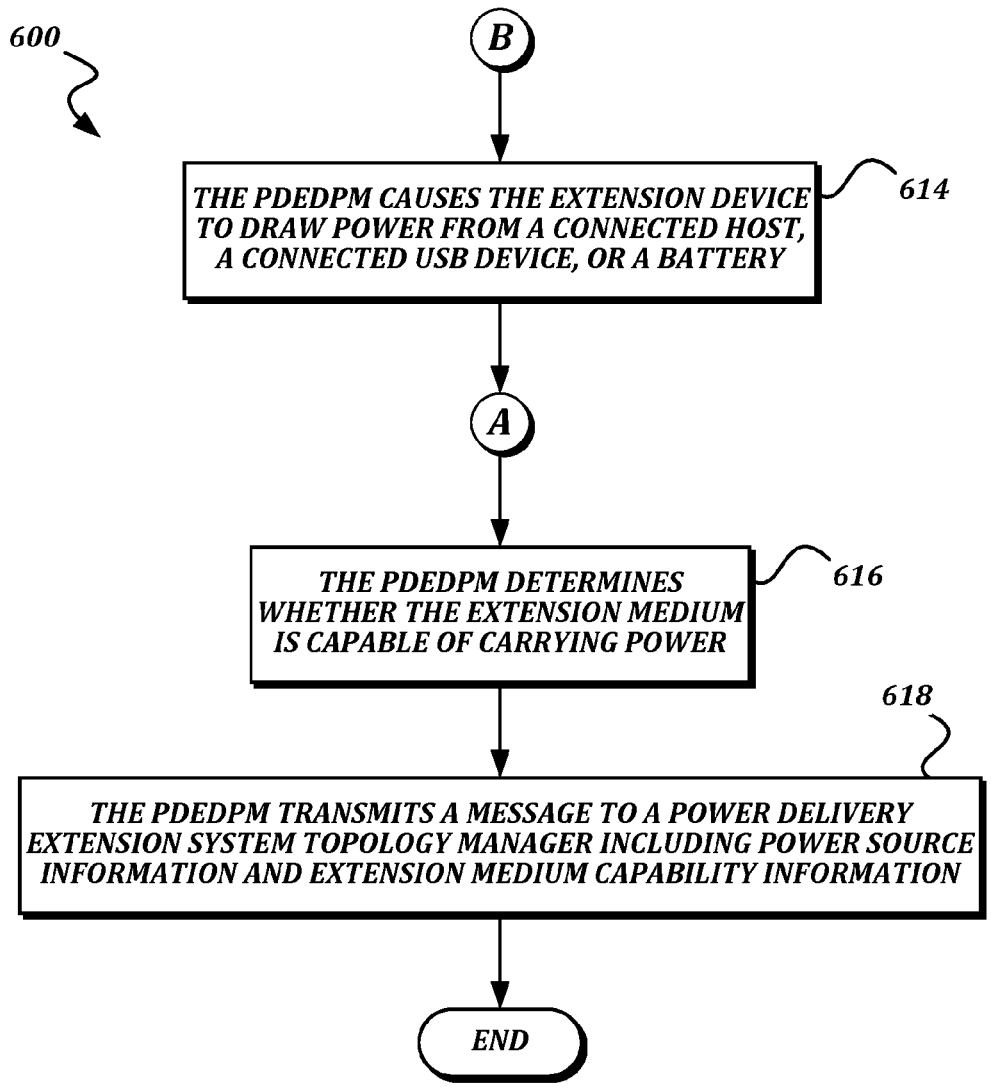

FIGS. 6A-6B are a flowchart that illustrates an exemplary embodiment of a method of starting an upstream or downstream power delivery extension device policy manager (PDEDPM) of an extension device, according to various aspects of the present disclosure. The method 600 helps determine what power source should be used by the extension device in order to provide power via USB Power Delivery. The extension device may be the UFP device 104 or DFP device 106, and so the PDEDPM could be the upstream PDEDPM 220 or the downstream PDEDPM 320. The method 600 is similar for the UFP device 104 and the DFP device 106, and so they are described together for brevity. In some embodiments, the method 600 as described assumes that a minimal amount of power is drawn from some source (such as a default voltage supplied by the USB bus to devices that do not negotiate for more power via USB Power Delivery, a small amount of power provided via the extension medium 120, a small amount of power provided by the battery or an external source, and/or the like) upon connection, in order to operate the PDEDPM and conduct the method 600.

From a start block, the method 600 proceeds to block 602, where the PDEDPM determines whether an external power source is available. As discussed above with respect to FIGS. 2 and 3, the external power source is a constant source of power accessible via the external power adapter. At decision block 604, a test is performed based on the determination of whether an external power source is available. If an external power source is available, then the result of the test at decision block 604 is YES, and the method 600 proceeds to block 606, where the PDEDPM causes the extension device to draw power from the external power source. This may be done using any suitable technique, including causing switching circuitry to couple the external power source to the power bus of the extension device, changing a firmware setting, or using any other suitable technique. The PDEDPM may also cause the selection of the external power source to be stored in a computer-readable medium, such as in an environment variable stored in volatile memory accessible by the PDEDPM. The method 600 then proceeds to a continuation terminal ("terminal A").

Otherwise, if an external power source is not available, then the result of the test at decision block 604 is NO, and the method 600 proceeds to block 608. At block 608, the PDEDPM determines whether the extension medium 120 is capable of providing power to the extension device and whether power is available from the extension medium 120. Determining whether the extension medium 120 is capable of providing power to the extension device and whether power is available from the extension medium 120 may include checking for presence of an extension medium 120 cable coupled to the extension medium interface by checking for a signature resistance; transmitting a signal via the extension medium 120 and checking for a response; checking for the presence of a chip in an active cable; and/or the like. If power is determined to be available, the determination may further include whether a minimum amount of power can be drawn, which may include a reserve amount for powering other devices. One example process for determining whether the extension medium 120 is capable of providing power and whether power is available is a process for powering up a Power over Ethernet (PoE) link.

At decision block 610, a test is performed based on the determination of whether the extension medium 120 is capable of providing power to the extension device and whether (adequate) power is available from the extension medium 120 (also referred to as "link power"). If link power is available, then the result of the test at decision block 610 is YES, and the method 600 proceeds to block 612, where the PDEDPM causes the extension device to draw power from the extension medium 120. In some embodiments, the PDEDPM may also cause the power-over-link engine to couple the power from the extension medium 120 to the power bus of the extension device. In some embodiments, the choice of the link power source may also be stored in a computer-readable medium, such as in an environment variable stored in volatile memory accessible by the PDEDPM. The method 600 then proceeds to a continuation terminal ("terminal A"). Otherwise, if link power is not available, then the result of the test at decision block 610 is NO, and the method 600 proceeds to another continuation terminal ("terminal B").

From terminal B (FIG. 6B), the method 600 proceeds to block 614, where the PDEDPM causes the extension device to draw power from a connected host device 102, a connected USB device 108, or a battery. The extension device will draw power from the host device 102 or battery 203 if the extension device is a UFP device 104, and will draw power from the USB device 108 or battery 303 if the extension device is a DFP device 106. In some embodiments, the PDEDPM may cause bus power or battery power to be configured, drawn, and provided to the power bus. In some embodiments, the PDEDPM may also cause the selection of the bus power source or battery to be stored in a computer-readable medium, such as in an environment variable stored in volatile memory. One of skill in the art will recognize that the method 600 as described assumes that power is available via at least one of the sources discussed above. If power is not available from any of these sources, the extension device cannot be powered (or at least cannot provide USB Power Delivery functionality).

The method 600 then proceeds to terminal A, and then to block 616, where the PDEDPM determines whether the extension medium 120 is capable of carrying power. Regardless of the power source chosen by the PDEDPM, this determination is made to check if the extension device can transmit power over the medium. In some embodiments, this test may be performed in a manner similar to the link power detection performed in block 608. In some embodiments, the determination may explicitly check to see if a device capable of being a Power over Ethernet sink is coupled to the extension medium 120. In some embodiments, the determination may check for a particular type of conductor or may query an active cable attached to the extension medium interface. In some embodiments, the determination described in block 616 may have already been made in block 608, and therefore may not be repeated in block 616. In some embodiments, the determined capability of the extension medium 120 may be stored in a computer-readable medium, such as in an environment variable stored in volatile memory.

At block 618, the PDEDPM transmits a message to a power delivery extension system topology manager (PDESTM) 116, the message including power source information and extension medium capability information. In other words, the PDEDPM informs the PDESTM 116 what power source it is using, and what capabilities it has determined are present in the extension medium. In some embodiments, the information transmitted to the PDESTM 116 may be retrieved from environment variables as discussed above. As discussed above, the PDESTM 116 may be part of the extension device (in which case the PDESTM 116 would be informed using an internal communication bus or direct memory communication), or may be on another device reachable via the extension medium 120 (in which case the PDESTM 116 would be informed via a packet, frame, or other transmission on the extension medium 120). The method 600 then proceeds to an end block and terminates.

FIGS. 7, 8A, 8B, 9A, 9B, and 9C are sequence diagrams that illustrate communications within exemplary embodiments of systems according to various aspects of the present disclosure. The sequence diagrams each show the host device 102, the UFP device 104, the power delivery extension system topology manager (PDESTM) 116, the DFP device 106, and the USB device 108. In each of the sequence diagrams, time flows vertically in the downward direction. As illustrated above, the host device 102 and the UFP device 104 communicate via a USB-compliant connection, and exchange information including USB power delivery messages. Similarly, the DFP device 106 and the USB device 108 communicate via a USB-compliant connection, and exchange information including USB power delivery messages.

The PDESTM 116 may reside on the UFP device 104, on the DFP device 106, or on a separate management computing device. If the PDESTM 116 resides on the UFP device 104, then the UFP device 104 communicates with the PDESTM 116 via an internal communication bus, and the DFP device 106 communicates with the PDESTM 116 via the extension medium. If the PDESTM 116 resides on the DFP device 108, then the DFP device 108 communicates with the PDESTM 116 via an internal communication bus, and the UFP device 106 communicates with the PDESTM 116 via the extension medium. If the PDESTM 116 resides on a separate management device, then both the UFP device 104 and the DFP device 106 communicate with the PDESTM 116 via the extension medium.

In each of the sequence diagrams, power state notifications and instructions may be sent using any suitable technique. In some embodiments, the power state notifications and/or instructions may be included in a specially formatted packet or frame with an indication of the desired value. In some embodiments, the power state notifications and/or instructions may be indicated via an unstructured signal or voltage. In some embodiments, the power state notifications and/or instructions may be sent using a network protocol such as TCP/IP or UDP/IP. In some embodiments wherein the sender and receiver are present on the same device, the power state notifications and/or instructions may be provided using a computer-readable medium which both the sender and receiver can access. In some embodiments, power notifications and other USB Power Delivery messages sent between the host device 102 and the UFP device 104, and between the DFP device 106 and the USB device 108, comply with the USB Power Delivery specification, though their contents may be synthesized in response to the instructions of the PDESTM 116 as opposed to reflecting the actual power delivery topology.

In each sequence diagram, it is illustrated that the UFP device 104 and the DFP device 106 take actions. In some embodiments, the action taken by the UFP device 104 may be performed or controlled at least in part by the upstream PDEDPM 220 on behalf of the UFP device 104, and the action taken by the DFP device 106 may be performed or controlled at least in part by the downstream PDEDPM 320. Despite these details regarding which components are performing the actions, the sequence diagrams and the discussion thereof refer only to the UPF device 104 and the DFP device 106 as a whole for the sake of clarity.

Figure 7:
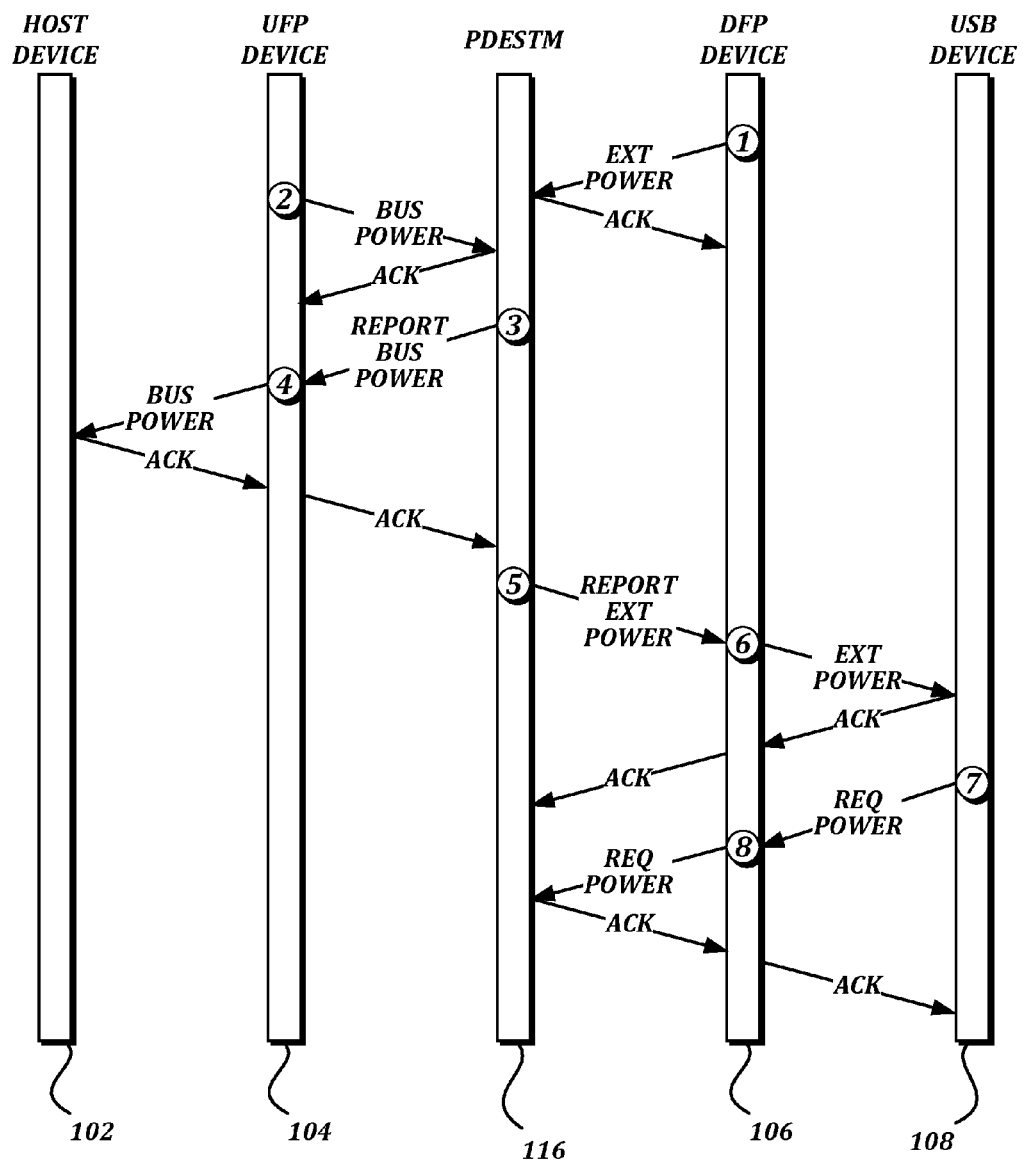
FIGS. 7, 8A, 8B, 9A, 9B, and 9C are sequence diagrams that illustrate communications within exemplary embodiments of systems according to various aspects of the present disclosure.

FIG. 7 illustrates communications within a system wherein the DFP device 106 is drawing power from an external power source and the UFP device 104 is drawing power from the USB bus. At point 1, the DFP device 106 transmits a first power state notification to the PDESTM 116 indicating that the power state of the DFP device 106 is externally powered, and the PDESTM 116 responds with an acknowledgement. At point 2, the UFP device 104 transmits a second power state notification to the PDESTM 116 indicating that the power state of the UFP device 104 is bus powered, and the PDESTM 116 responds with an acknowledgement.

Once the PDESTM 116 is aware of the power state of the UFP device 104 and the DFP device 106, it can determine how the extension system should be presented to the host device 102. At point 3, the PDESTM 116 transmits an instruction to the UFP device 104 to cause the UFP device 104 to report to the host device 102 that it is bus powered or otherwise not externally powered, and at point 4, the UFP device 104 transmits a notification to the host device 102 indicating that it is not externally powered. This notification to the host device 102 may be in the form of a USB power delivery capabilities message with the externally powered bit cleared, or may be in any other suitable format. The host device 102 may transmit an acknowledgement back to the UFP device 104, and the UFP device 104 may transmit an acknowledgement back to the PDESTM 116. In some embodiments, the report may indicate that the "extension system" is not externally powered, if the extension system is being exposed to the host device 102 as a USB hub device instead of being transparent. In some embodiments, the report may indicate that the USB device 108 is not externally powered or does not support USB Power Delivery, if the extension system is transparent to the host device 102.

Multiple benefits may be obtained and technical problems may be overcome by informing the host device 102 that the extension system lacks external power despite the use of an external power source by the DFP device 106. For example, the host device 102 will refrain from turning off bus power to the UFP device 104, and will not attempt to request a role swap with the UFP device 104. Accordingly, the UFP device 104 will remain powered, and the connection between the UFP device 104 and the DFP device 106 will remain active. As another example, in embodiments wherein the UFP device 104 and DFP device 106 are transparent to the host device 102 and the extension medium 120 cannot transmit power, the host device 102 and the USB device 108 may be confused if further processing isn't performed and the "externally powered" state of the USB device 108 or DFP device 106 is reported to the host device 102.

While the extension system could simply block USB power delivery traffic in cases where power cannot be transmitted over the extension medium and the UFP device 104 is bus powered, in some embodiments, the PDESTM 116 may allow power to be delivered by the externally powered DFP device 106 without fully informing the host. Accordingly, at point 5, the PDESTM 116 transmits an instruction to the DFP device 106 to cause the DFP device 106 to report to the USB device 108 that it is externally powered, and at point 6, the DFP device 106 transmits the notification to the USB device 108 indicating that it is externally powered. The USB device 108 may acknowledge the notification, and the DFP device 106 may acknowledge the instruction. The notification to the USB device 108 may be in the form of a USB power delivery capabilities message with the externally powered bit set, or may be in any other suitable format. In some embodiments, the DFP device 106 may notify the USB device 108 that it is externally powered without receiving an instruction from the PDESTM 116 to do so, once it begins to draw power from an external source.

At point 7, the USB device 108 transmits a request for power to the DFP device 106. This request for power is compliant with the USB power delivery specifications, and may be compatible with a Request message as defined in Section 6.4.2 of the USB Power Delivery specification. At point 8, the DFP device 106 transmits a request for power to the PDESTM 116, which approves the request with an acknowledgement if the PDESTM 116 determines that the requested amount of power is available to the DFP device 106. The DFP device 106 then approves the request from the USB device 108 with an acknowledgement, and the USB device 108 may then begin to draw the requested amount of power.

The sequence diagram of FIG. 7 ends at this point. It is to be noted that though the PDESTM 116 approved the request for power from the USB device 108, the change in the power topology is not reported to the host device 102. Though this may prevent the system policy manager of the host device 102 from having accurate power delivery information for portions of the power delivery topology that are beyond the UFP device 104, the host device 102 may still communicate with the USB device 108 using other standard USB communication techniques, and the USB device 108 can still obtain power from the DFP device 106.

Figure 8A:
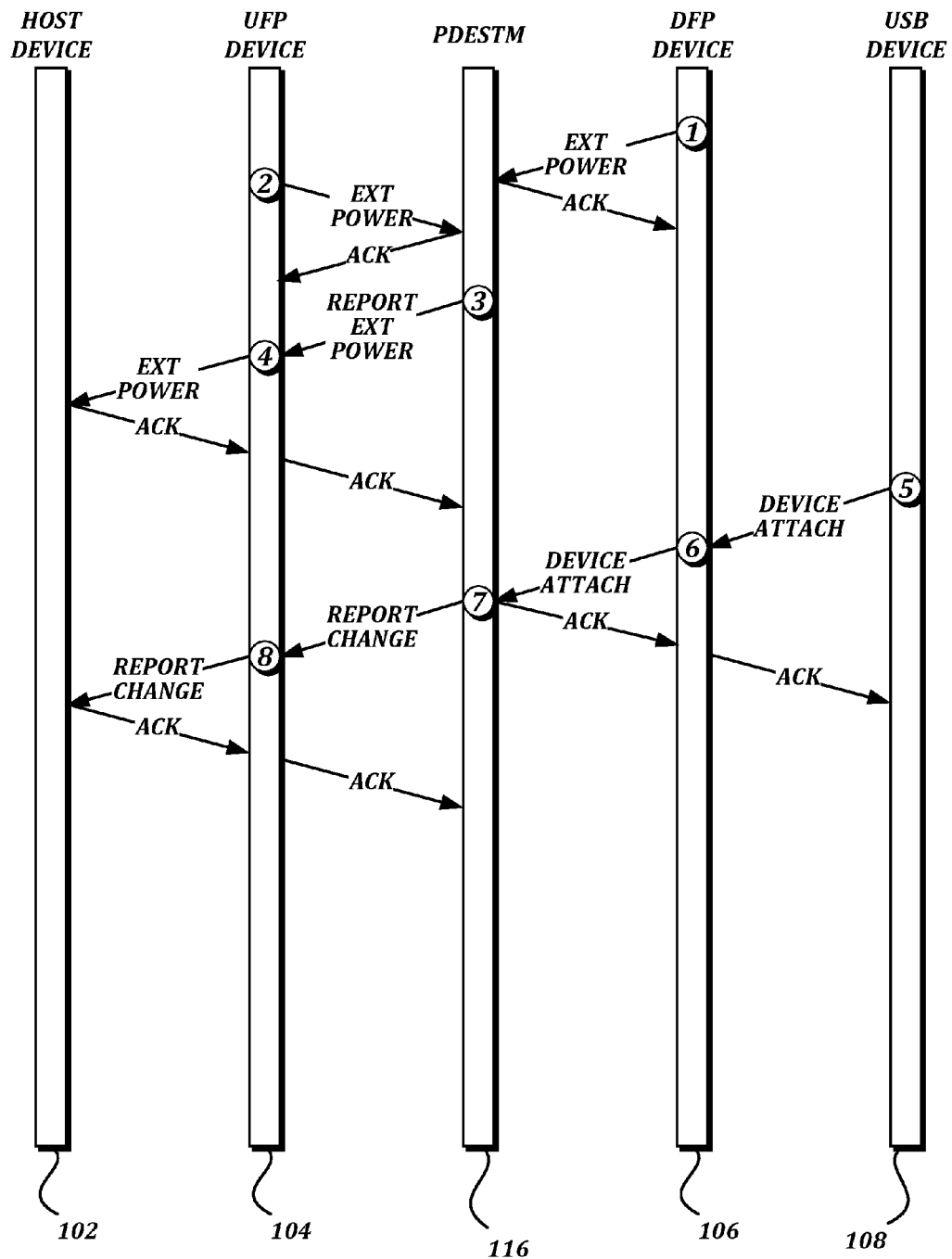
Figure 8B:
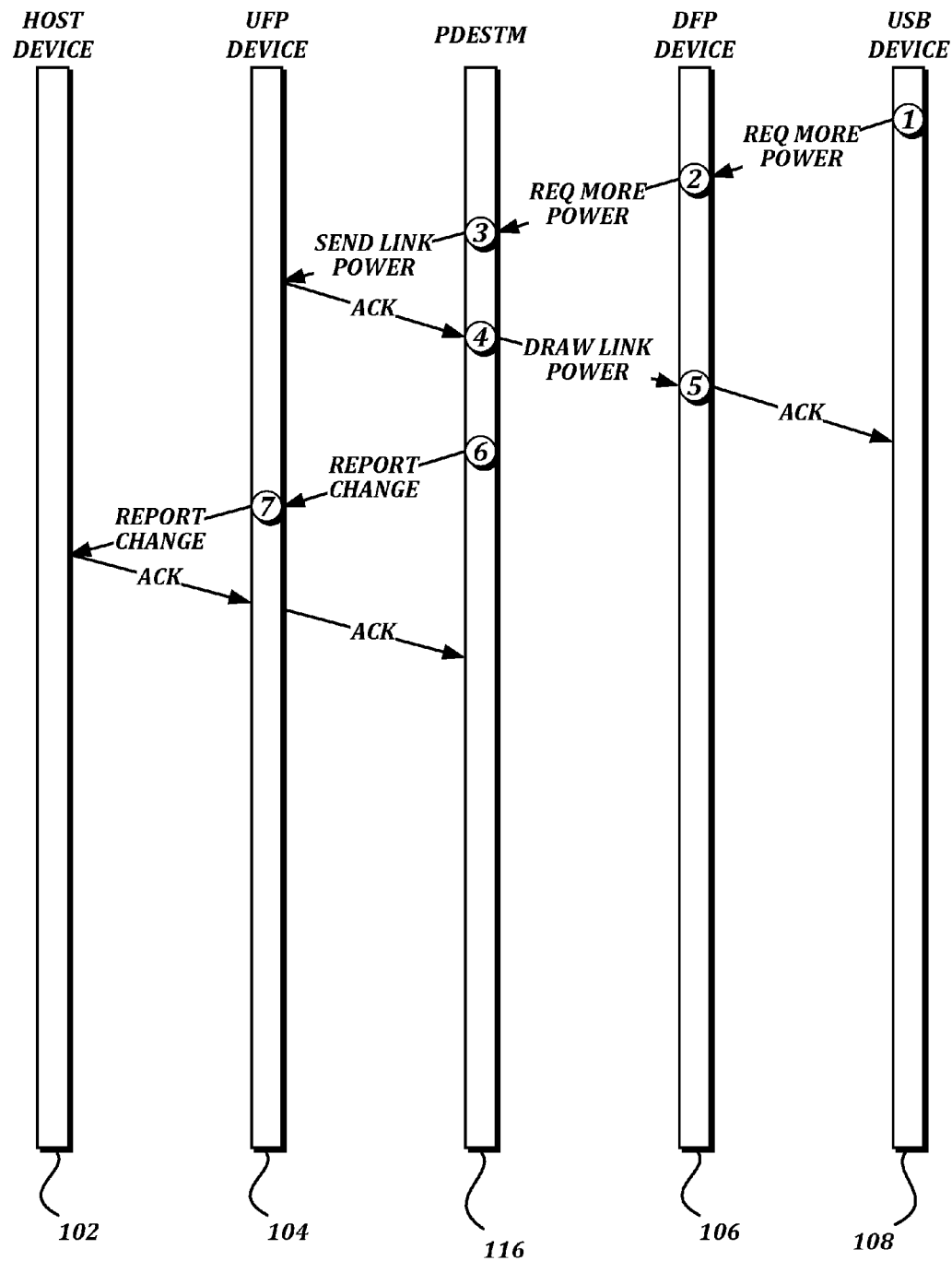

FIGS. 8A and 8B illustrate communications within a system wherein the DFP device 106 is drawing power from an external power source and the UFP device 104 is also drawing power from an external power source. At point 1, the DFP device 106 transmits a first power state notification to the PDESTM 116 indicating that the power state of the DFP device 106 is externally powered, and the PDESTM 116 responds with an acknowledgement. At point 2, the UFP device 104 transmits a second power state notification to the PDESTM 116 indicating that the power state of the UFP device 104 is externally powered, and the PDESTM 116 responds with an acknowledgement.

Again, now that the PDESTM 116 is aware of the power state of the UFP device 104 and the DFP device 106, it can determine how the extension system should be presented to the host device 102. Because both the power state notifications indicated that the UFP device 104 and the DFP device 106 are both externally powered, the PDESTM 116 can determine that the extension system should be presented to the host as externally powered. Accordingly, at point 3, the PDESTM 116 transmits an instruction to the UFP device 104 to cause the UFP device 104 to report to the host device 102 that it is externally powered, and at point 4, the UFP device 104 transmits a notification to the host device 102 indicating that it is externally powered. This notification to the host device 102 may be in the form of a USB power delivery capabilities message with the externally powered bit set, or may be in any other suitable format. The host device 102 may transmit an acknowledgement back to the UFP device 104, and the UFP device 104 may transmit an acknowledgement back to the PDESTM 116. As described above, the report may indicate that the extension system is externally powered if it is exposed to the host device 102 as a USB hub, or it may indicate that the USB device 108 is externally powered if the extension system is transparent to the host device 102.

By reporting as externally powered when both the UFP device 104 and the DFP device 106 are externally powered, the extension system can provide the full functionality of USB Power Delivery throughout the entire power topology, despite the presence of the non-USB compliant extension medium between the UFP device 104 and the DFP device 106. For example, at point 5, the USB device 108 may be attached to the DFP device 106, a device attach event may be generated and transmitted to the DFP device 106, or some other event may occur by which the DFP device 106 is informed that a USB power delivery capable USB device 108 is now connected. At point 6, the DFP device 106 transmits a notification to the PDESTM 116 to report the attachment of the USB device 108. The PDESTM 116 may respond to the report with an acknowledgement, and the DFP device 106 may respond to the device attachment with an acknowledgement.

The PDESTM 116 determines that because both the UFP device 104 and the DFP device 106 are externally powered, the attachment of the USB device 108 may be reported to the host device 102. Accordingly, at point 7, the PDESTM 116 transmits an instruction to the UFP device 104 to report the change in the power delivery topology to the host device 102, and at point 8, the UFP device 104 reports the change to the host device 102 using any suitable technique, such as a USB power delivery change notification and/or the like. The host device 102 may acknowledge the report to the UFP device 104, and the UFP device 104 may acknowledge the instruction to the PDESTM 116.

A further sequence that follows the sequence illustrated in FIG. 8A is illustrated in FIG. 8B. At point 1 in FIG. 8B (which follows point 8 in FIG. 8A), the USB device 108 transmits a request to the DFP device 106 for more power than is currently being drawn by the USB device 108. At point 2, the DFP device 106 informs the PDESTM 116 that the USB device 108 has requested more power. The PDESTM 116, similar to a system policy manager as described in the USB Power Delivery specifications, determines if the extension system can provide the requested power, as well as where the requested power should be sourced from. In some embodiments, the PDESTM 116 may determine that the DFP device 106 is capable of servicing the request for additional power by itself, and may instruct the DFP device 106 to provide the requested power from its current power source.

However, in some embodiments, the PDESTM 116 may determine that the external power source used by the DFP device 106 cannot provide enough power to service the request for additional power, and so may attempt to find another source for the additional power. In the illustrated sequence of FIG. 8B, the PDESTM 116 has determined that power transmission over the extension medium 120 is possible, that the UFP device 104 has adequate power reserves to provide the additional power to the USB device 108, and that the extension medium 120 is capable of carrying the additional power (while possibly also compensating for any power loss over the extension medium 120). After making this determination, at point 3, the PDESTM 116 transmits an instruction to the UFP device 104 to send power over the extension medium 120, and the UFP device 104 acknowledges the instruction. In some embodiments, the UFP device 104 may begin transmitting the power at this point, while in other embodiments, the UFP device 104 may merely inform its power-over-link engine 204 or upstream PDEDPM 220 that a request for power received from the DFP device 106 via the extension medium should be honored.

At point 4, the PDESTM 116 transmits an instruction to the DFP device 106 to draw power from the extension medium 120. Upon receiving this instruction, the DFP device 106 may begin drawing power provided by the UFP device 104 from the extension medium 120, as discussed in further detail above. Once the DFP device 106 is drawing the necessary power to service the power request, at point 5, the DFP device 106 sends an acknowledgement to the USB device 108 to approve the power request. Subsequently, the USB device 108 may begin to draw the additional power from the DFP device 106. In some embodiments, the DFP device 106 may send one or more Wait messages to the USB device 108 between points 1 and 5, or use other techniques to allow time for processing of the power request.

At point 6, the PDESTM 116 instructs the UFP device 104 to report the change in the power topology to the host device 102, and at point 7, the UFP device 104 transmits a change notification to the host device 102. The host device 102 may acknowledge the change notification, and the UFP device 104 may acknowledge the instruction. In this way, the system policy manager on the host device 102 may have a complete view of the power topology, just as if the USB device 108 were coupled directly to the host device 102 or coupled to the host device 102 via one or more USB-compliant hubs, instead of via a non-USB-compliant extension medium 120.

Figure 9A:
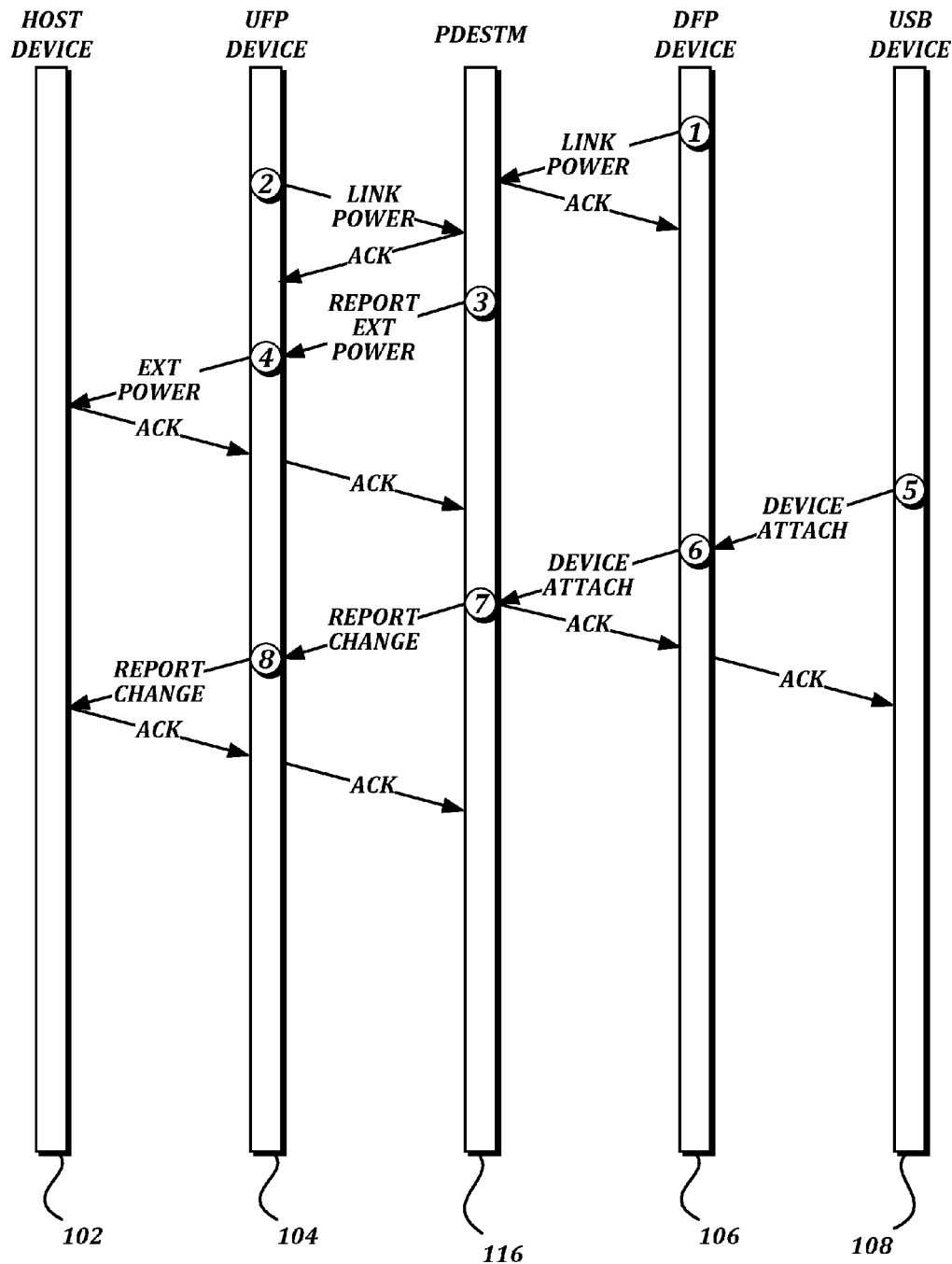
Figure 9B:
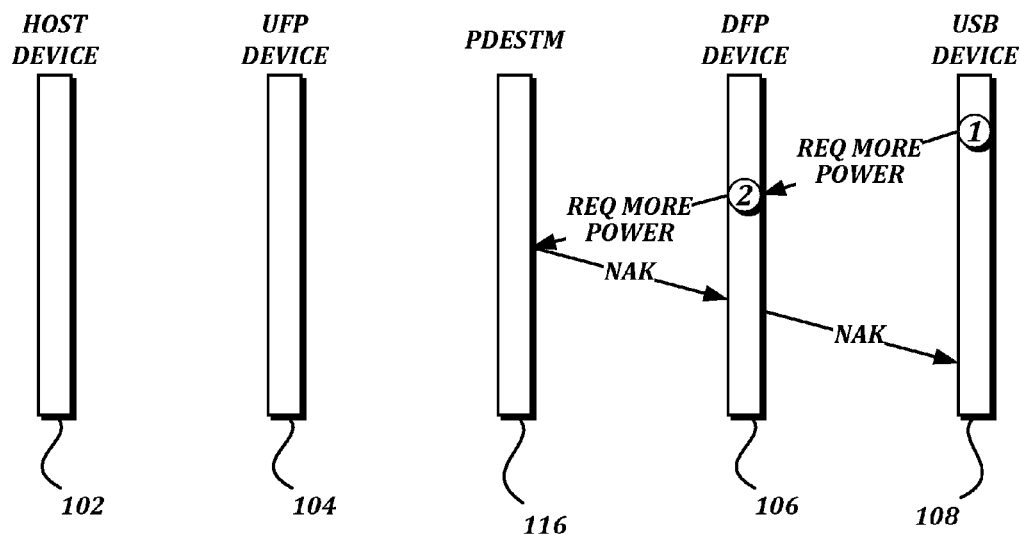
Figure 9C:
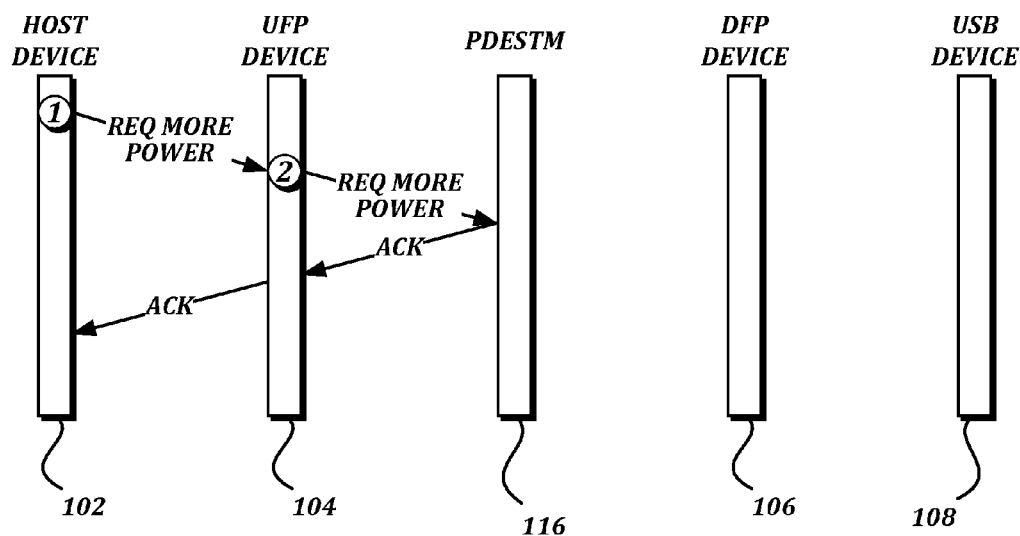

FIGS. 9A, 9B, and 9C illustrate communications within a system wherein the DFP device 106 is drawing power from the extension medium 120 and the UFP device 104 is also drawing power form the extension medium 120. Because neither the UFP device 104 nor the DFP device 106 is drawing power from an external power source, it can be assumed that neither device has access to an external power source in this scenario. It can also be assumed that there is an independent source of power on the extension medium 120, such as a PoE-enabled switch, one or more PoE injectors, and/or the like, that can independently provide power to both the UFP device 104 and the DFP device 106, as opposed to the UFP device 104 and the DFP device 106 powering each other over the extension medium 120. This is different from being externally powered by an external power source, because the PDESTM 116 may need to compensate for limitations in the capabilities of the extension medium 120, and/or limitations in the power available from the independent source of power. That is, it can be assumed by the PDESTM 116 that any number of externally powered devices can simultaneously draw their maximum supported power. However, for link-powered devices, the PDESTM 116 may have to take power delivery capabilities of the link power source into account, and may not be able to concurrently provide maximum supported power to all connected devices.

At point 1, the DFP device 106 transmits a first power state notification to the PDESTM 116 indicating that the power state of the DFP device 106 is link powered, and the PDESTM 116 responds with an acknowledgement. At point 2, the UFP device 104 transmits a second power state notification to the PDESTM 116 indicating that the power state of the UFP device 104 is link powered, and the PDESTM 116 responds with an acknowledgement.

Again, now that the PDESTM 116 is aware of the power state of the UFP device 104 and the DFP device 106, it can determine how the extension system should be presented to the host device 102. Because both the power state notifications indicated that the UFP device 104 and the DFP device 106 are link powered, the PDESTM 116 can determine that the extension system should be presented to the host device 102 as externally powered. Even though neither of the UFP device 104 and the DFP device 106 are actually powered by an external power source, the externally powered bit may be presented to the host device 102 because the extension system does not require bus power from the host device 102 to always be available.

Accordingly, at point 3, the PDESTM 116 transmits an instruction to the UFP device 104 to cause the UFP device 104 to report to the host device 102 that it is externally powered, and at point 4, the UFP device 104 transmits a notification to the host device 102 indicating that it is externally powered. As above, this notification to the host device 102 may be in the form of a USB power delivery capabilities message with the externally powered bit set, or may be in any other suitable format. The host device 102 may transmit an acknowledgement back to the UFP device 104, and the UFP device 104 may transmit an acknowledgement back to the PDESTM 116. As above, the report may indicate to the host device 102 that the extension system is externally powered if it is exposed to the host device 102 as a USB hub, or it may indicate to the host device 102 that the USB device 108 is externally powered if the extension system is transparent.

By configuring to report as externally powered when both UFP device 104 and DFP device 106 are link powered, you can obtain full functionality of USB power delivery throughout the entire topology, despite the presence of the non-USB compliant extension medium 120, and despite the fact that neither the UFP device 104 nor the DFP device 106 are receiving unlimited external power. For example, at point 5, the USB device 108 may be attached to the DFP device 106, a device attach event may be generated, and the device attach event may be transmitted to the DFP device 106, or some other event may occur by which the DFP device 106 is informed that a USB power delivery capable USB device 108 is now connected. At point 6, the DFP device 106 transmits a notification to the PDESTM 116 to report the attachment of the USB device 108. The PDESTM 116 may respond to the report with an acknowledgement, and the DFP device 106 may respond to the device attachment with an acknowledgement.

The PDESTM 116 determines that because both the UFP device 104 and the DFP device 106 are link powered, the attachment of the USB device 108 may be reported to the host device 102. Accordingly, at point 7, the PDESTM 116 transmits an instruction to the UFP device 104 to report the change in the power delivery topology to the host device 102, and at point 8, the UFP device 104 reports the change to the host device 102 using any suitable technique, such as a USB power delivery change notification and/or the like. The host device 102 may acknowledge the report to the UFP device 104, and the UFP device 104 may acknowledge the instruction to the PDESTM 116.

FIG. 9B illustrates a sequence that follows the sequence illustrated in FIG. 9A, wherein the USB device 108 requests more power than is available to the DFP device 106 via the extension medium 120. At point 1 (which follows point 8 of FIG. 9A), the USB device 108 transmits a request to the DFP device 106 for more power than is currently being provided to the USB device 108. At point 2, the DFP device 106 transmits a request for more power to the PDESTM 116. The PDESTM 116 determines whether the request can be fulfilled by the extension system, based on one or more of the present power being supplied to the DFP device 106, the present power being provided on the extension medium 120 throughout the entire network along with a maximum amount of power that can be provided throughout the entire network, a maximum amount of power that can be provided to a single device via the extension medium 120, the capabilities of the DFP device 106 itself, the power needs of any other devices already being supplied power by the DFP device 106, and/or any other suitable information. In the illustrated case, the PDESTM 116 determines that not enough additional power can be provided to the DFP device 106 via the extension medium 120 in order to service the power request, and so the PDESTM 116 transmits a rejection to the DFP device 106. The DFP device 106, in turn, transmits a rejection of the power request to the USB device 108. In other embodiments, the PDESTM 116 may determine that the extension medium 120 is capable of providing enough additional power to the DFP device 106 to service the request, and so may instead acknowledge the request. As illustrated, the PDESTM 116 does not cause a notification of the failed request to be transmitted to the host device 102, though in some embodiments, the PDESTM 116 may do so.

FIG. 9C illustrates another sequence that follows the sequence illustrated in FIG. 9A, wherein the host device 108 requests more power from the UFP device 104. In this sequence, the requested amount of power is available to the UFP device 104 via the extension medium 120. At point 1 (which follows point 8 of FIG. 9A), the host device 102 transmits a request to the UFP device 104 for more power than is currently being provided to the host device 102. At point 2, the UFP device 104 transmits a request for more power to the PDESTM 116. The PDESTM 116 determines whether the request can be fulfilled by the extension system, based on one or more of the present power being supplied to the UFP device 104, the present power being provided on the extension medium 120 throughout the entire network along with a maximum amount of power that can be provided throughout the entire network, a maximum amount of power that can be provided to a single device via the extension medium 120, the capabilities of the UFP device 106 itself, the power needs of any other devices already being supplied power by the UFP device 104, and/or any other suitable information. In the illustrated case, the PDESTM 116 determines that the additional power requested can be provided to the UFP device 104 via the extension medium 120 in order to service the power request, and so the PDESTM 116 transmits an acknowledgement to the UFP device 104. The UFP device 104, in turn, transmits an acknowledgement to the host device 102. Subsequently, the UFP device 104 may begin to draw the additional power required from the extension medium 120, and the host device 102 may begin to draw the requested additional power from the UFP device 104. The host device 102 may also inform its own system policy manager of the change, once the acknowledgement is received. In other embodiments, the PDESTM 116 may determine that the power request cannot be serviced, and so may reject the request as illustrated in FIG. 9B.

In some embodiments, additional power delivery topology changes and functionality may be available. For example, a power request for a USB device 108 may be granted instead of being denied when both the UFP device 104 and the DFP device 106 are link powered, unlike the sequence illustrated in FIG. 9B. As another example, devices may swap roles between Producer/Consumer and Consumer/Producer as described in the USB Power Delivery specifications, based on whether the PDESTM 116 allows the externally powered bit to be set. In such an embodiment, when the externally powered bit is sent to host device 102, the host device 102 and UFP device 104 may swap roles as power delivery source (Producer/Consumer) and power delivery sink (Consumer/Producer). As still another example, when the externally powered bit is sent to USB device 108, the USB device 108 and the DFP device 106 may swap roles as power source and power sink, even in the situation illustrated in FIG. 7.

In the discussion above, various components (such as the power delivery extension system topology manager, the USB extension engines, the power-over-link engines, and the power delivery extension device policy managers) are described as "managers" or "engines." In general, the terms "engine" and "manager" as used herein refer to logic embodied in hardware or software instructions and executed by hardware devices. The logic can include computer-executable instructions written in a programming language, such as C, C++, COBOL, JAVA™, PHP, Perl, HTML, CSS, JavaScript, VBScript, ASPX, Microsoft .NET™ languages such as C#, and/or the like. An engine or manager may be compiled into executable programs or written in interpreted programming languages. Engines and managers may be callable from other engines or managers, or from themselves. Generally, the engines and managers described herein refer to modules that can be merged with other engines or managers, or can be divided into sub-engines or sub-managers. Software instructions that help provide an engine or manager can be stored in any type of computer readable medium or computer storage device and be stored on and executed by one or more general purpose computing devices, thus creating a special purpose computing device configured to provide the engine or manager. In some embodiments, one or more of the engines or managers described herein may be implemented within a logic device such as a PLD, an ASIC, a FPGA, and/or the like. In some embodiments, one or more of the engines or managers described herein may be implemented using a dedicated digital hardware device implemented, for example, as a state machine configured to perform the actions described herein; within an application specific processor; and/or within any other suitable computing device.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for providing Universal Serial Bus (USB) power delivery across a non-USB extension medium, the system comprising:
    an upstream facing port device (UFP device), including:
    at least one USB upstream facing port configured to be communicatively coupled to a USB host device; and
    an extension medium interface configured to be coupled to the non-USB extension medium;
    a downstream facing port device (DFP device), including:
    at least one USB downstream facing port configured to be communicatively coupled to a USB device; and
    an extension medium interface configured to be coupled to the non-USB extension medium; and
    a power delivery extension system topology manager (PDESTM) communicatively coupled to the UFP device and the DFP device and configured to manage power delivery policies implemented by the UFP device and the DFP device by
    receiving a first power state notification from the UFP device;
    receiving a second power state notification from the DFP device; and
    sending an instruction to the UFP device to report a power state to a system policy manager, wherein the reported power state is based on the first power state notification and the second power state notification, wherein the instruction causes the UFP device to report a bus-powered state to the system policy manager when the first power state notification indicates that the UFP device is bus powered and the second power state notification indicates that the DFP device is externally powered.

2. The system of claim 1, wherein the PDESTM is a component of the UFP device or the DFP device.

3. The system of claim 1, further comprising a management computing device separate from the UFP device and DFP device;
    wherein the PDESTM is a component of the management computing device;
    wherein the UFP device is part of a plurality of UFP devices communicatively coupled to the non-USB extension medium;
    wherein the DFP device is part of a plurality of DFP devices communicatively coupled to the non-USB extension medium;
    wherein the PDESTM is configured to manage power delivery policies for the plurality of UFP devices and the plurality of DFP devices in view of power delivery capabilities available via the non-USB extension medium; and
    wherein the management computing device is configured to provide power to one or more USB extension devices via the non-USB extension medium.

4. The system of claim 1, wherein the DFP device further includes a downstream power delivery extension device policy manager (PDEDPM) configured to:
    request power delivery policies from the PDESTM;
    control local policy engines associated with the one or more downstream facing ports based on the power delivery policies; and
    report changes reported by the local policy engines to the PDESTM.

5. The system of claim 1, wherein the UFP device further includes an upstream power delivery extension device policy manager (PDEDPM) configured to:
    request power delivery policies from the PDESTM;
    control local policy engines associated with the one or more upstream facing ports based on the power delivery policies; and
    report changes as instructed by the PDESTM to a system policy manager.

6. The system of claim 1, wherein at least one of the UFP device and the DFP device includes a power-over-link engine configured to send power to and receive power from the extension medium.

7. A computer-implemented method performed by a power delivery extension system topology manager of a USB extension system, the USB extension system comprising an upstream facing port device (UFP device) and a downstream facing port device (DFP device) connected by a non-USB compliant extension medium, the method comprising:
    receiving a first power state notification from the UFP device;
    receiving a second power state notification from the DFP device; and
    sending an instruction to the UFP device to report a power state to a system policy manager, wherein the reported power state is based on the first power state notification and the second power state notification, and wherein the instruction causes the UFP device to report a bus-powered state to the system policy manager when the first power state notification indicates that the UFP device is bus powered and the second power state notification indicates that the DFP device is externally powered.

8. The method of claim 7, further comprising:
    receiving a request for power from the DFP device in response to a power request received by the DFP device from a USB device;
    sending an instruction to the DFP device to provide the requested power to the USB device; and
    withholding reporting to both the UFP device and the system policy manager of a change in the power topology.

9. The method of claim 7, wherein the instruction causes the UFP device to report an externally powered state to the system policy manager when the first power state notification indicates that the UFP device is externally powered and the second power state notification indicates that the DFP device is externally powered.

10. The method of claim 9, further comprising:
receiving a notification from the DFP device indicating attachment of a USB device; and
sending an instruction to the UFP device to inform the system policy manager of the attachment of the USB device.

11. The method of claim 9, further comprising:
receiving a request for power from the DFP device in response to a power request received by the DFP device from a USB device, wherein the request for power includes a power amount that is greater than a power amount drawn by the DFP device at the time of the request;
sending an instruction to the UFP device to send power to the extension medium; and
sending an instruction to the DFP device to draw power from the extension medium to provide the requested power to the USB device.

12. A computer-implemented method performed by a power delivery extension system topology manager of a USB extension system, the USB extension system comprising an upstream facing port device (UFP device) and a downstream facing port device (DFP device) connected by a non-USB compliant extension medium, the method comprising:
receiving a first power state notification from the UFP device;
receiving a second power state notification from the DFP device; and
sending an instruction to the UFP device to report a power state to a system policy manager, wherein the reported power state is based on the first power state notification and the second power state notification, and wherein the instruction causes the UFP device to report an externally powered state to the system policy manager if the first power state notification indicates that the UFP device is link powered and the second power state notification indicates that the DFP device is link powered.

13. The method of claim 12, further comprising:
receiving a notification from the DFP device indicating attachment of a USB device;
sending an instruction to the UFP device to inform the system policy manager of the attachment of the USB device;
receiving a request for power from the DFP device in response to a power request received by the DFP device from a USB device, wherein the request for power includes a power amount that is greater than a power amount drawn by the DFP device at the time of the request; and
in response to determining that the DFP device is requesting more power than is available from a power source via the extension medium, transmitting a notification to the DFP device that the request for power is rejected.

* * * * *